(12) United States Patent
Mills

(10) Patent No.: US 12,146,522 B2
(45) Date of Patent: Nov. 19, 2024

(54) FASTENER INSERT FOR A COMPOSITE SANDWICH PANEL, A PANEL ASSEMBLY, AND A METHOD OF FASTENING A COMPONENT TO A COMPOSITE SANDWICH PANEL

(71) Applicant: The Boeing Company, Chicago, IL (US)

(72) Inventor: Christopher J. Mills, Charleston, SC (US)

(73) Assignee: The Boeing Company, Chicago, IL (US)

(*) Notice: Subject to any disclaimer, the term of this patent is extended or adjusted under 35 U.S.C. 154(b) by 252 days.

(21) Appl. No.: 17/541,178

(22) Filed: Dec. 2, 2021

(65) Prior Publication Data
US 2022/0178395 A1 Jun. 9, 2022

Related U.S. Application Data

(60) Provisional application No. 63/122,724, filed on Dec. 8, 2020.

(51) Int. Cl.
*F16B 5/02* (2006.01)
(52) U.S. Cl.
CPC .................. *F16B 5/0208* (2013.01)
(58) Field of Classification Search
CPC .... F16B 37/043; F16B 5/0258; F16B 37/044; F16B 5/01; F16B 5/0208
USPC .......................................... 411/182, 111–112
See application file for complete search history.

(56) References Cited

U.S. PATENT DOCUMENTS

| | | | | |
|---|---|---|---|---|
| 3,678,798 A | * | 7/1972 | Van Niel | F16B 37/043 411/43 |
| 4,284,378 A | * | 8/1981 | Mizusawa | F16B 37/043 411/21 |
| 4,557,100 A | | 12/1985 | Gorges | |
| 4,890,964 A | * | 1/1990 | Lindley | F16B 39/36 411/324 |
| 5,005,265 A | * | 4/1991 | Muller | F16B 21/07 411/908 |
| 5,378,099 A | * | 1/1995 | Gauron | F16B 5/01 411/258 |
| 5,399,053 A | * | 3/1995 | Duran | F16B 21/18 411/105 |
| 6,406,235 B1 | * | 6/2002 | Bantle | F16B 12/24 411/41 |

(Continued)

*Primary Examiner* — Sarang Afzali
*Assistant Examiner* — Darrell C Ford
(74) *Attorney, Agent, or Firm* — Quinn IP Law

(57) ABSTRACT

A fastener insert for securement to a composite sandwich panel at an opening in the composite sandwich panel includes a base and a fastener carrier. The base has a body and a flange integral with the body. The flange extends laterally outward of an outer perimeter of the body. The base defines a central cavity extending entirely through both the body and the flange. The base includes a first locking feature disposed at the central cavity. The fastener carrier is configured to insert into the central cavity of the base. The fastener carrier defines a fastener opening and has a second locking feature configured for mechanical engagement with the first locking feature of the base to retain the fastener carrier to the base. A panel assembly and a method of fastening a component to a composite sandwich panel utilize the fastener insert.

16 Claims, 11 Drawing Sheets

(56) References Cited

U.S. PATENT DOCUMENTS

| | | | |
|---|---|---|---|
| 7,413,367 B2* | 8/2008 | Hawang | F16B 5/0614 403/243 |
| 8,136,328 B2 | 3/2012 | Erickson et al. | |
| 8,636,454 B2* | 1/2014 | Okada | F16B 19/1081 24/295 |
| 9,850,927 B2 | 12/2017 | Bradley et al. | |
| 10,016,955 B2 | 7/2018 | Mills | |
| 2003/0222377 A1 | 12/2003 | Cox | |
| 2005/0002728 A1* | 1/2005 | Weiser | F16B 21/08 403/229 |
| 2005/0086773 A1* | 4/2005 | Kuhnle | B60R 13/0206 24/297 |
| 2007/0158931 A1* | 7/2007 | Baumgartner | B60R 21/20 403/294 |
| 2007/0172327 A1* | 7/2007 | Hansen | F16B 19/1081 411/41 |
| 2008/0028577 A1* | 2/2008 | Soman | F16B 21/075 24/293 |
| 2008/0226413 A1* | 9/2008 | Stephen | F16B 5/0208 411/103 |
| 2008/0292425 A1* | 11/2008 | Pineiros | F16B 37/044 411/92 |
| 2010/0026028 A1* | 2/2010 | Smith | F16B 37/043 296/29 |
| 2010/0119325 A1* | 5/2010 | Edland | F16B 5/0657 411/182 |
| 2011/0044782 A1* | 2/2011 | Lange | F16B 37/043 411/511 |
| 2013/0183089 A1* | 7/2013 | Podsadny | F16B 21/09 403/376 |
| 2013/0243523 A1* | 9/2013 | De Jong | B60R 21/213 403/326 |
| 2015/0043993 A1* | 2/2015 | Camus | F16B 21/07 411/508 |
| 2015/0117050 A1* | 4/2015 | Burton | B60Q 1/2638 29/525.01 |
| 2015/0132078 A1* | 5/2015 | Yamamoto | F16B 21/12 411/22 |
| 2016/0252127 A1* | 9/2016 | Hattori | F16B 37/02 411/523 |
| 2017/0036750 A1* | 2/2017 | Lewis | B64C 1/12 |
| 2018/0209464 A1* | 7/2018 | Sugimoto | F16B 21/086 |
| 2019/0085883 A1 | 3/2019 | Rios et al. | |
| 2020/0032829 A1* | 1/2020 | Lee | F16B 19/1081 |
| 2020/0284279 A1* | 9/2020 | Gao | E03F 5/06 |

* cited by examiner

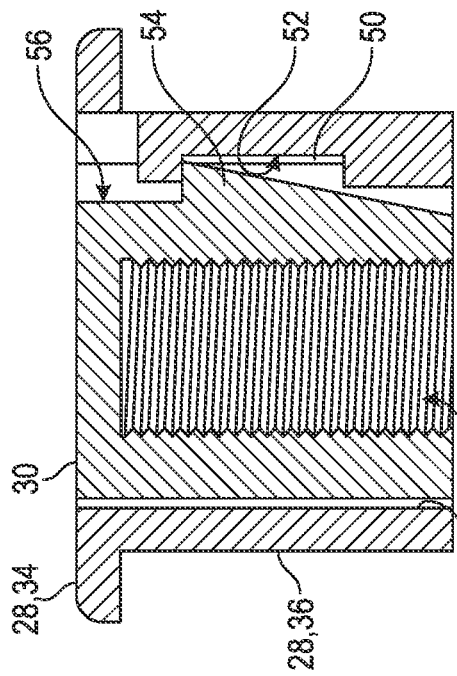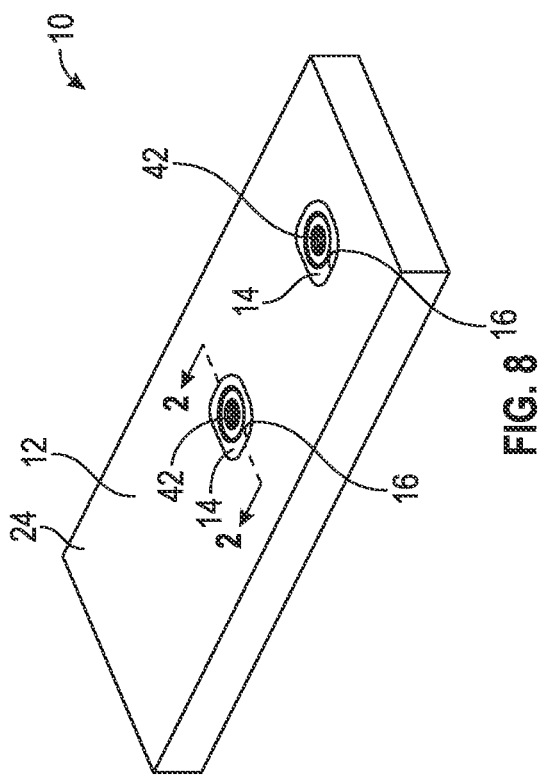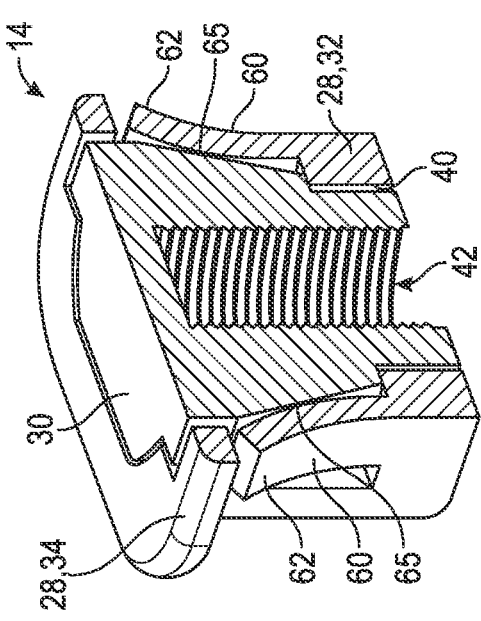

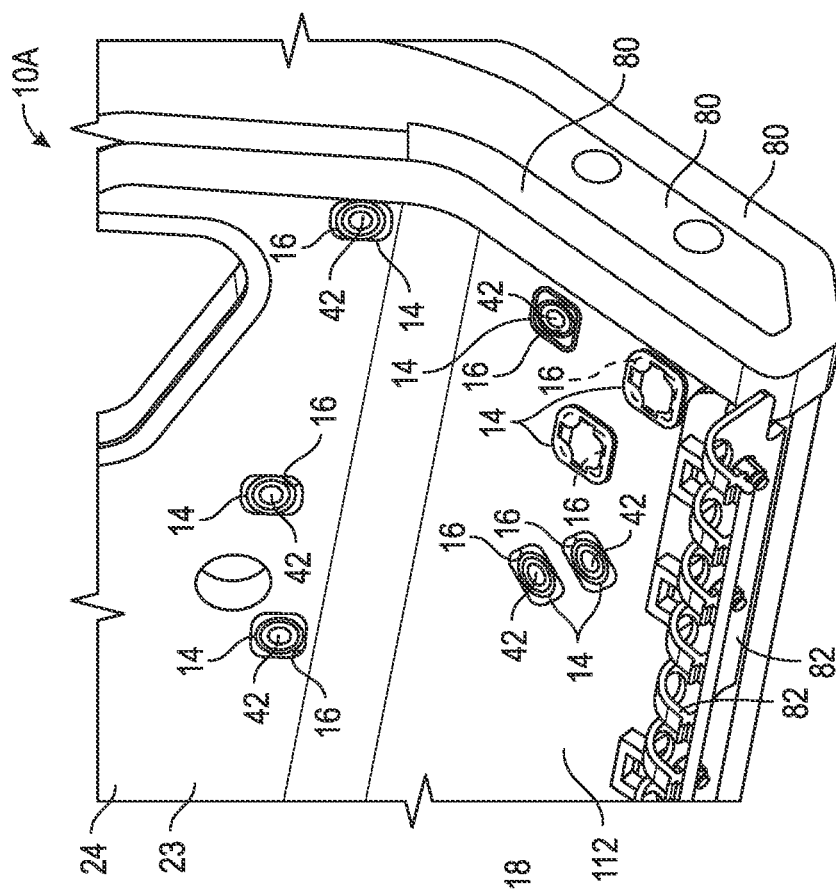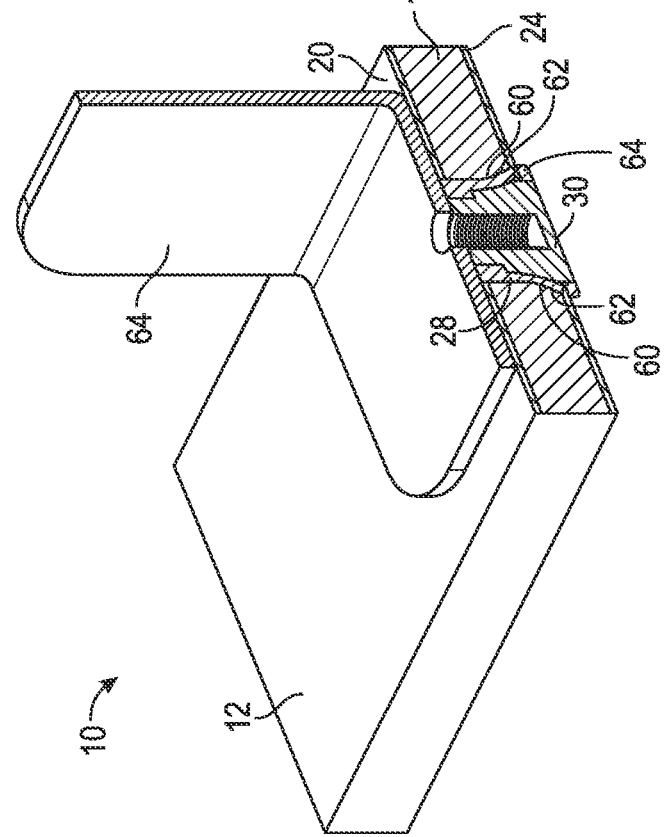

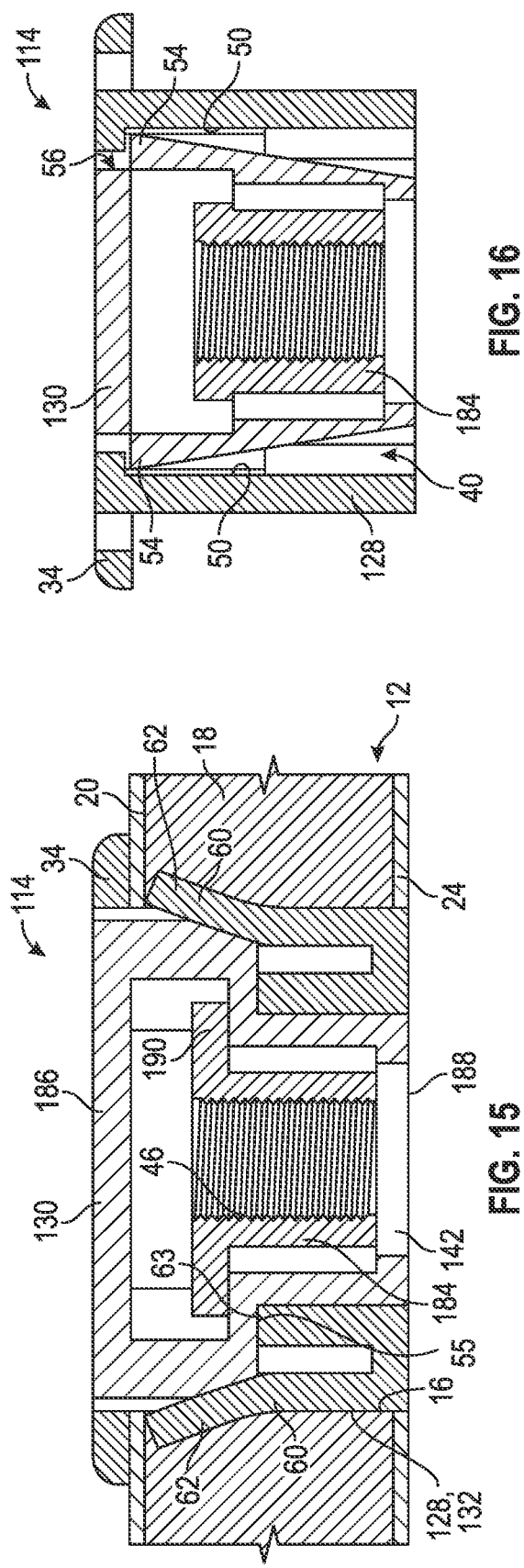
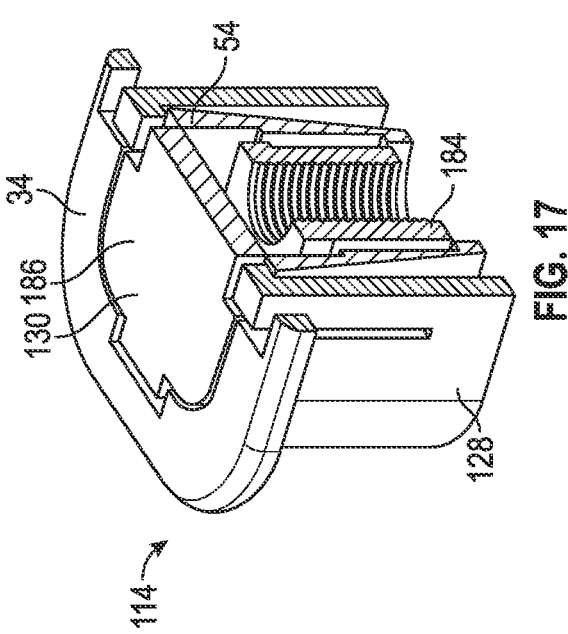
FIG. 15
FIG. 16
FIG. 17

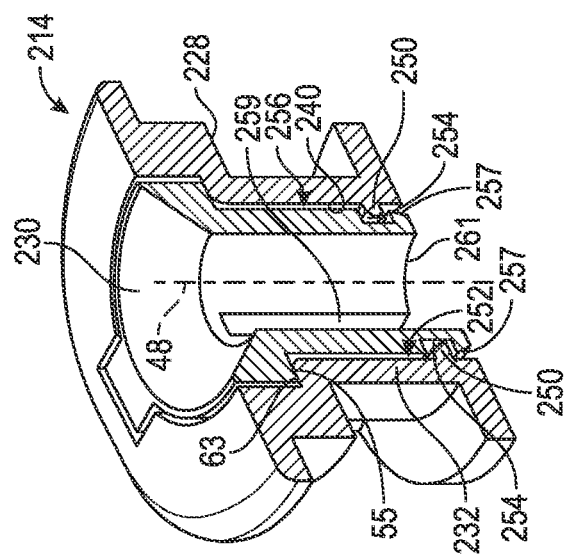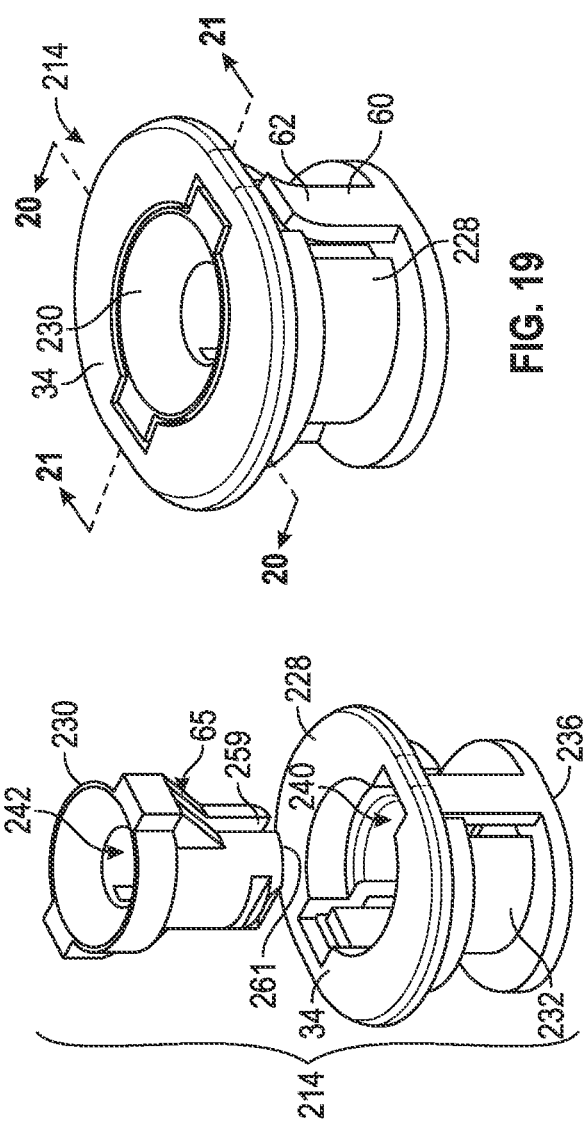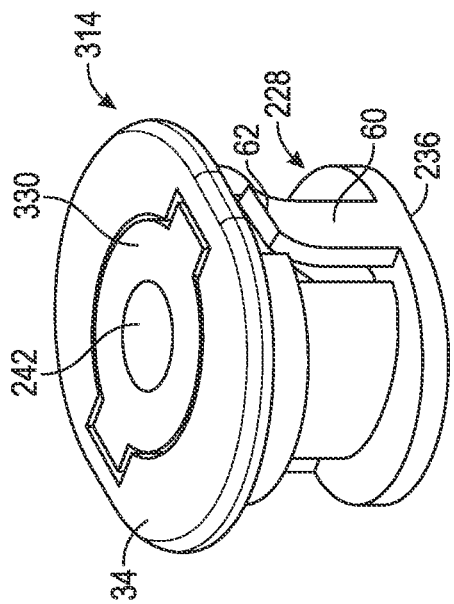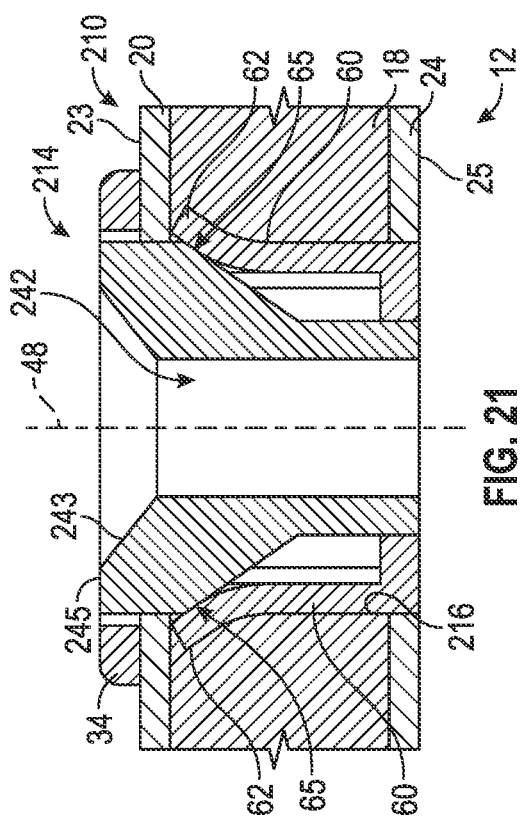

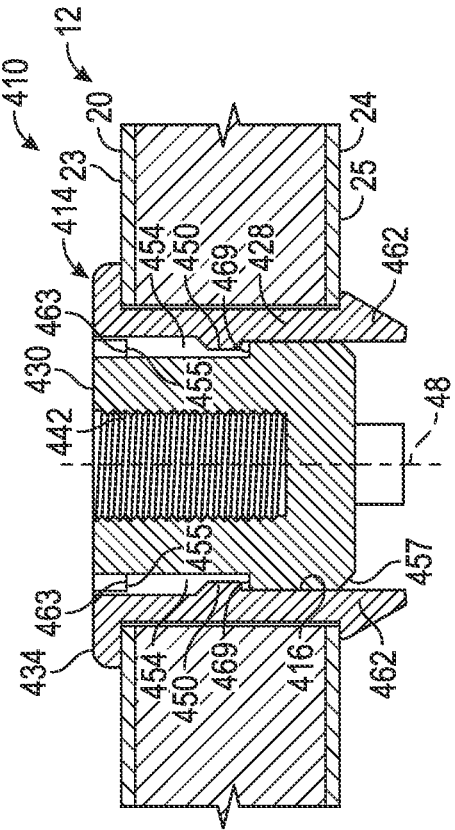
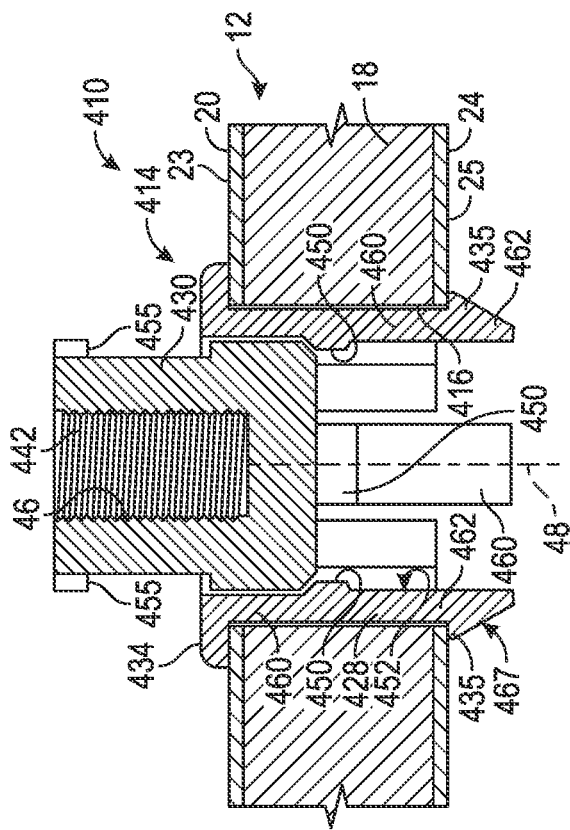
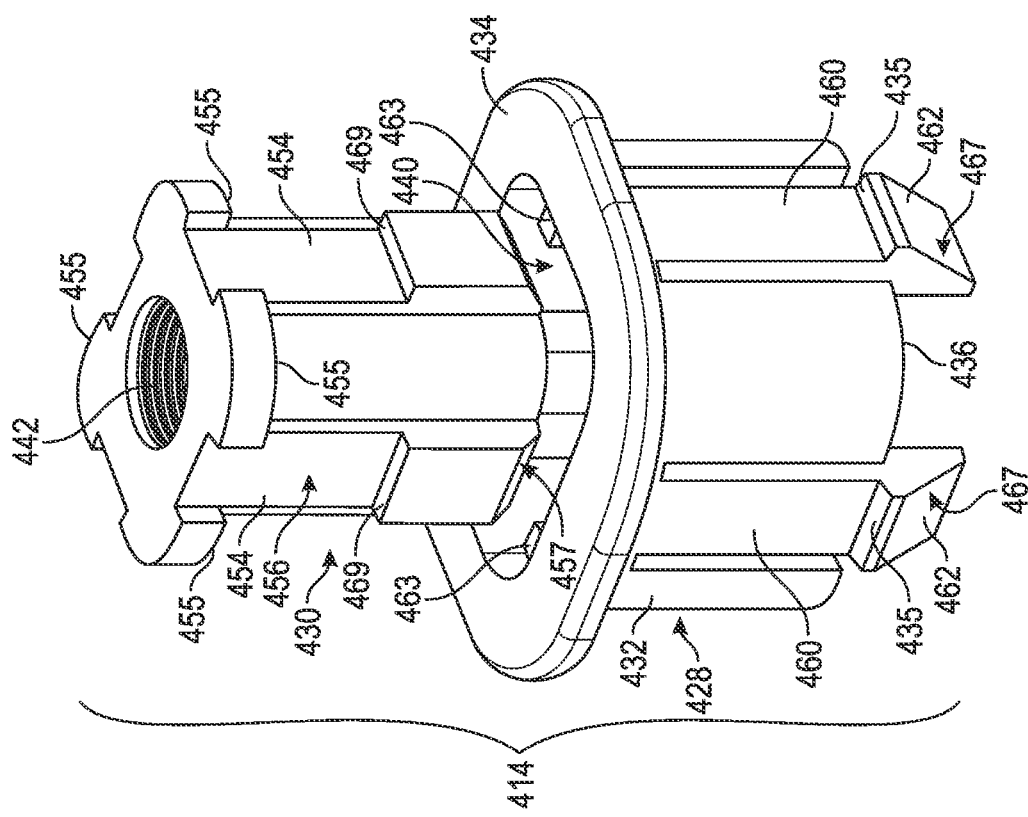

FASTENER INSERT FOR A COMPOSITE SANDWICH PANEL, A PANEL ASSEMBLY, AND A METHOD OF FASTENING A COMPONENT TO A COMPOSITE SANDWICH PANEL

CROSS-REFERENCE TO RELATED APPLICATION

The present application claims the benefit of priority to U.S. Provisional Application No. 63/122,724, filed on Dec. 8, 2020, which is hereby incorporated by reference in its entirety.

TECHNICAL FIELD

The disclosure relates to a fastener insert that mechanically secures to a composite sandwich panel, a panel assembly having the fastener insert, and a method of fastening a component to a composite sandwich panel using the fastener insert.

BACKGROUND

Composite sandwich panels are often used in applications requiring high structural rigidity and low weight, such as in the aerospace industry. An example composite sandwich panel has a relatively lightweight core (such as a foam or paper core) and skins (also referred to as outer plies or face sheets) of a different material covering the core. The core is generally thicker than the skins, and the material of the skins may be more dense and/or may have a greater ability to withstand shear, tensile, and/or compressive loading. To attach components to the panel, an opening is cut in the panel and a threaded fastener insert is potted in the opening. More specifically, an adhesive is deposited around the fastener insert in the opening. A disadvantage of this attachment method is the relatively long cure time of the adhesive which increases production time and cost. For example, a cure time of 90 to 240 minutes is often necessary.

SUMMARY

A fastener insert is disclosed that mechanically secures to a composite sandwich panel at an opening in the panel without potting. More specifically, the fastener insert has features that mechanically engage the composite sandwich panel. Because no cure time is necessary, the fastener insert results in easier and quicker assembly processes in comparison to potted fastener inserts. In an example, a fastener insert for securement to a composite sandwich panel at an opening in the composite sandwich panel comprises a base and a fastener carrier. The base has a body and a flange integral with the body. The flange extends laterally outward of an outer perimeter of the body. The base defines a central cavity extending entirely through both the body and the flange. The base includes a first locking feature disposed at the central cavity. The fastener carrier is configured to insert into the central cavity of the base. The fastener carrier defines a fastener opening and has a second locking feature configured for mechanical engagement with the first locking feature of the base to retain the fastener carrier to the base. For example, the mechanical engagement may be a snap-fit engagement of the first and second locking features. As used herein, components "snap-fit" to one another when a feature of one resiliently flexes and locks to a feature of the other during movement of one of the components toward the other component, such as during a one-way insertion of one of the components into the other component. A snap-fit engagement may or may not result in an audible snap-like sound when the feature locks after resiliently flexing.

A panel assembly that utilizes the fastener insert to fasten components to a composite sandwich panel comprises a composite sandwich panel having a core, a first skin covering a first side of the core and a second skin covering an opposing second side of the core. The composite sandwich panel defines an opening extending through the core, the first skin, and the second skin. The panel assembly further includes a fastener insert configured to secure to the composite sandwich panel at the opening without potting. The fastener insert comprises a base having a body extending into the opening in the composite sandwich panel. An outer perimeter of the body matches a perimeter of the opening in the composite sandwich panel. The base has a flange integral with the body and extending laterally outward of the opening in the composite sandwich panel and is disposed at and may interface with an exterior of the first skin. The base also defines a central cavity extending entirely through the body and the flange, and includes a first locking feature disposed at the central cavity. A fastener carrier is configured to insert into the central cavity of the base. The fastener carrier defines a fastener opening, and has a second locking feature configured for mechanical engagement with the first locking feature of the base to retain the fastener carrier in the base.

In various embodiments, the first locking feature of the base may be a notch in an inner surface of the body at the central cavity, and the second locking feature of the fastener carrier may be an external protrusion projecting outward at an outer surface of the fastener carrier. The external protrusion may extend into the notch. In another embodiment, the first locking feature of the base may be a rib protruding from an inner surface of the body into the central cavity, and the second locking feature of the fastener carrier may be a channel facing laterally outward at an outer surface of the fastener carrier. The protrusion may extend into the channel. In still other embodiments, the first locking feature of the base may be a plurality of protrusions protruding laterally inward into the central cavity, the plurality of protrusions spaced axially apart from the second opening to extend over and interfere with an end of the fastener carrier opposing the insertion end when the fastener carrier is inserted into the central cavity, and the second locking feature of the fastener carrier may be the end of the fastener.

The flange of the body may bear against the skin around the opening in the composite sandwich panel to resist the fastener insert pulling out of the opening under tension. Additionally, the fastener carrier may have an interference feature that interferes with the composite sandwich panel to prevent the fastener from being pushed out of the opening, keeping the fastener insert in place in the opening of the composite sandwich panel until a component is fastened to the composite sandwich panel at the fastener insert with a fastener. For example, the interference feature may trap one of the skins of the composite sandwich panel between the interference feature and the flange to retain the fastener insert to the composite sandwich panel. For example, the base may include arms extending lengthwise at the outer perimeter of the body. Each of the arms may have a free end that is disposed proximate to the flange and is configured to flex laterally outward under interference with the fastener carrier inserted in the central cavity. Stated differently, the free ends flex outward when the fastener carrier is mechanically engaged to the base. The free ends may move into the relatively soft core when flexed laterally outward, trapping one of the skins between the free end and the flange to hold the fastener insert to the composite sandwich panel. In another example, the base includes arms extending lengthwise at the outer perimeter of the body, each of the arms configured to flex laterally outward under interference with the fastener carrier inserted in the central cavity and each having a free end disposed at an end of the body opposite from the flange. Each of the arms may have a laterally-outward extending lip at the free end. The lip may extend laterally outward of the opening in the composite sandwich panel and interface with an exterior of the second skin (e.g., the skin opposite from that on which the flange rests), holding the fastener insert to the composite sandwich panel with the lip and the flange at the opposing sides of the composite sandwich panel.

In some embodiments, the outer perimeter of the body of the base is a non-circular shape, and the opening in the composite sandwich panel has a corresponding non-circular shape. The non-circular body fills the opening in the composite sandwich panel, and the flange supports the base on the composite sandwich panel prior to the base securing to the composite sandwich panel with the interference feature. The non-circular opening enable the skins of the composite sandwich panel to bear torque without allowing the fastener insert to rotate relative to the composite sandwich panel. For example torque may be applied to the fastener insert when threading a fastener thereto. In other embodiments, both the outer perimeter of the body and the opening in the composite sandwich panel are circular. In order to prevent rotation under torque applied to the fastener insert during tightening of a fastener, the base includes a projection extending from the flange and spaced laterally apart from and parallel with a longitudinal axis of the central cavity. The composite sandwich panel has a second opening that receives the projection. With the flange thus anchored to the composite sandwich panel at both the body and at the projection, the fastener insert resists rotation under torque even though the body has a circular outer perimeter.

A method of fastening a component to a composite sandwich panel is disclosed herein. The composite sandwich panel includes a core, a first skin covering one side of the core at a first side of the composite sandwich panel, and a second skin covering an opposing side of the core at a second side of the composite sandwich panel. The method includes inserting a fastener insert into an opening in the composite sandwich panel in a direction from the first side to the second side, the fastener insert including a base having a body with an outer perimeter having a shape corresponding with the opening in the composite sandwich panel, and the body having a central cavity extending through the base and a flange integral with and extending laterally outward from the body. Inserting the fastener is so that the flange is disposed at and may rest directly or indirectly on the first skin of the composite sandwich panel. The method also includes forcing a fastener carrier of the fastener insert into the central cavity of the base from the first side of the composite sandwich panel to mechanically engage the fastener carrier with the base. For example, forcing the fastener carrier may be by pushing the fastener carrier into the central cavity. The fastener carrier has a fastener opening extending in the fastener carrier. In some embodiments of the method, either inserting the fastener insert into the opening in the composite sandwich panel or forcing the fastener carrier to mechanically engage the fastener carrier with the base engages an interference feature of the base with the composite sandwich panel to resist withdrawal of the body from the opening in the composite sandwich panel in a direction opposite from the direction of insertion. For example, mechanically engaging the fastener carrier with the base may simultaneously cause the base to mechanically engage the composite sandwich panel to resist pulling the fastener carrier out of the opening.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The drawings described herein are for illustrative purposes only, are schematic in nature, are not necessarily to scale, and are intended to be exemplary rather than to limit the scope of the disclosure.

FIG. 5 is a cross-sectional perspective view of the fastener insert of FIG. 4 taken at lines 5-5 in FIG. 4.

FIG. 6 is a cross-sectional view of the fastener insert of FIG. 4 taken at lines 6-6 in FIG. 4.

FIG. 7 is a cross-sectional perspective view of the fastener insert of FIG. 4 taken at lines 7-7 in FIG. 4.

FIG. 8 is a perspective view of the panel assembly of FIG. 1 including two of the non-potted fastener inserts of FIG. 1 secured to the composite sandwich panel of FIG. 1 without potting.

FIG. 11 is cross-sectional view of the panel assembly of FIG. 9 taken at lines 11-11 in FIG. 9.

FIG. 12 is a fragmentary perspective view of another panel assembly including multiple ones of the non-potted fastener inserts of FIG. 1.

FIG. 15 is a cross-sectional view of a panel assembly including the fastener insert of FIG. 13 taken at lines 15-15 in FIG. 13.

FIG. 16 is a cross-sectional view of the fastener insert of FIG. 13 taken at lines 16-16 in FIG. 13.

FIG. 17 is a cross-sectional perspective view of the fastener insert of FIG. 13 taken at lines 17-17 in FIG. 13.

FIG. 18 is an exploded perspective view of a third embodiment of a non-potted fastener insert having a base and a fastener carrier that snap-fits to the base.

FIG. 19 is a perspective view of the fastener insert of FIG. 18 showing the fastener carrier snap-fit to the base.

FIG. 20 is a cross-sectional view of the fastener insert of FIG. 19 taken at lines 20-20 in FIG. 19.

FIG. 21 is a cross-sectional view of a panel assembly including the fastener insert of FIG. 19 taken at lines 21-21 in FIG. 19.

FIG. 22 is a perspective view of a fourth embodiment of a non-potted fastener insert having a base and a fastener carrier shown snap-fit to the base.

FIG. 23 is an exploded perspective view of a fifth embodiment of a non-potted fastener insert having a base and a fastener carrier that snap-fits to the base.

FIG. 24 is a cross-sectional illustration of a panel assembly including the fastener insert of FIG. 23 showing the base supported on a composite sandwich panel and just prior to snap-fitting the fastener carrier to the base.

FIG. 25 is a cross-sectional illustration of the panel assembly of FIG. 24 showing the fastener insert secured to the composite sandwich panel without potting after snap-fitting the fastener carrier to the base.

DETAILED DESCRIPTION

Disclosed herein are various embodiments of fastener inserts for composite sandwich panels that secure to the panel without potting and that resist being pulled or pushed out of the panel as well as rotating relative to the panel. Instead of time-consuming potting, the fastener insert includes a base and a fastener carrier, which are two separate components that mechanically engage with one another, and the fastener insert mechanically engages the panel. The base is supported on the composite sandwich panel by a flange and mechanically secures to the composite sandwich panel by an interference feature, which in some embodiments is made to interfere with the panel by the action of snap-fitting the fastener carrier to the base. A non-circular perimeter or other feature of the fastener insert also enables the fastener insert to resist rotating relative to the composite sandwich panel when under torque, such as when a fastener is threaded to the insert.

Figure 1:
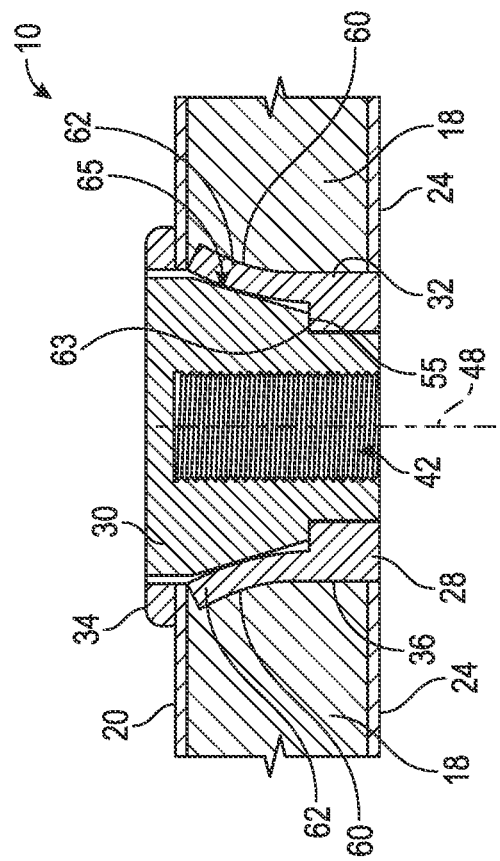
FIG. 1 is a cross-sectional illustration of a panel assembly showing a first embodiment of a non-potted fastener insert having a base supported on a composite sandwich panel and just prior to snap-fitting a fastener carrier to the base to secure the fastener insert to the composite sandwich panel.
Figure 3:
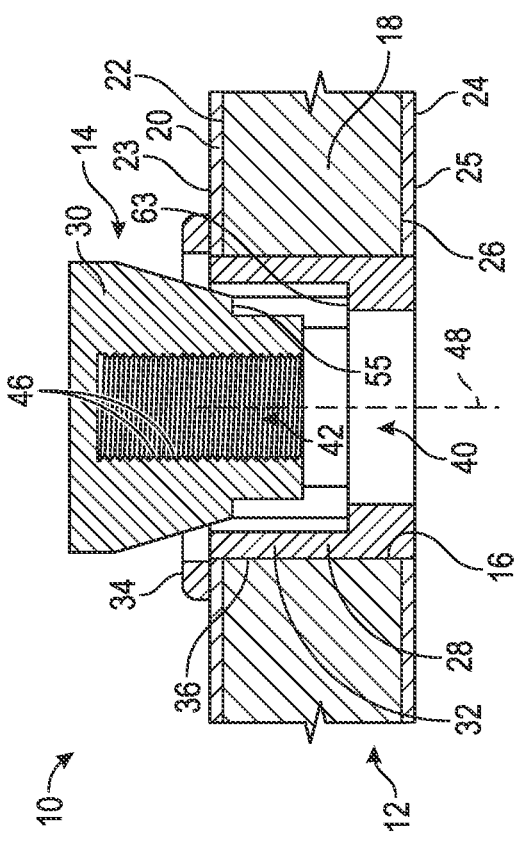
FIG. 3 is an exploded perspective view of the panel assembly of FIG. 1.

Referring to the drawings, wherein like reference numbers refer to like components, FIG. 1 shows a panel assembly 10 that includes a composite sandwich panel 12 and a fastener insert 14 secured to the composite sandwich panel 12 at a panel opening 16 in the composite sandwich panel 12 without potting. As such, the fastener insert 14 may be referred to as a non-potted fastener insert. The composite sandwich panel 12 has a core 18, a first skin 20 covering a first side 22 of the core 18 and defining a first side 23 of the composite sandwich panel 12, and a second skin 24 covering an opposing second side 26 of the core 18 and defining an opposite second side 25 of the composite sandwich panel 12. The core 18 is a relatively lightweight material, such as foam or paper, and may include fibers or sheets including an aramid material such as NOMEX or KEVLAR, available from DuPont de Nemours, Inc. The core 18 may be configured as cells with a honeycomb structure or other structure. The first and second skins 20, 24 may be a different material than the core 18 that may be more dense than the material of the core 18, and may enable the core 18 to bear greater tension, compression, and/or shears loads, for example. The first and second skins 20, 24 may be a fiberglass or carbon fiber with a cured resin base, a graphite/phenolic prepreg fabric or tape. Additionally, either or both of the skins 20, 24 may include multiple plies. The panel opening 16 extends through the core 18, the first skin 20, and the second skin 24. Stated differently, the panel opening 16 is a through hole and has a non-circular perimeter 58 as best shown in FIG. 3.

The fastener insert 14 includes a base 28 and a fastener carrier 30, each being a separate, unitary component. Stated differently, the fastener insert 14 is a two-piece fastener insert. The base 28 and the fastener carrier 30 may each be a molded plastic, for example. The base 28 has a body 32 and a flange 34 integral with the body 32. The flange 34 extends laterally outward of an outer perimeter 36 of the body 32, as best shown in FIG. 1. The base 28 defines a central cavity 40 extending entirely through both the body 32 and the flange 34. Stated differently, the central cavity 40 is a through hole. The fastener carrier 30 is configured to insert into the central cavity 40 of the base 28. In FIG. 1, the fastener carrier 30 is shown partially inserted into the central cavity 40, and in FIG. 2 the fastener carrier 30 is shown fully inserted into the central cavity 40. The fastener insert 14 is flush with an outer surface of the second skin 24 when the fastener carrier 30 is fully inserted (also shown in FIGS. 8 and 11) or at least does not extend outward of the second skin 24.

The fastener carrier 30 defines a fastener opening 42 that will ultimately receive a fastener 44 (one shown in phantom and one in solid in FIG. 10) to secure a component to the composite sandwich panel 12. The fastener opening 42 may be threaded to receive a threaded fastener (threads 46 shown in FIG. 1) or a threaded sleeve may be inserted into the fastener carrier 30 at the fastener opening 42 to provide threads that receive a threaded fastener. In the embodiment shown, the fastener opening 42 is a blind hole in that it does not extend entirely through the fastener carrier 30. Alternatively, the fastener opening 42 could be a through hole as in the embodiments of FIGS. 18-23.

Figure 2:
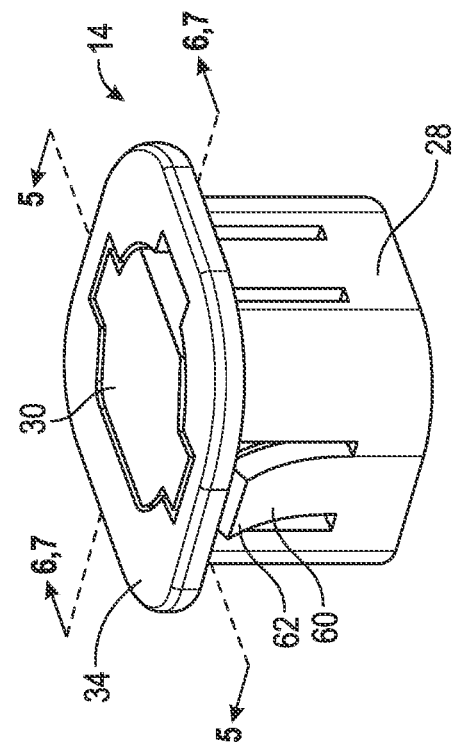
FIG. 2 is a cross-sectional illustration of the panel assembly of FIG. 1 taken at lines 2-2 in FIG. 8 showing the fastener insert of FIG. 1 secured to the composite sandwich panel without potting after snap-fitting the fastener carrier to the base.

The base 28 and the fastener carrier 30 include complementary locking features that mechanically engage by snap-fitting to one another to lock the fastener carrier 30 to the base 28 when the fastener carrier 30 is pushed further into the central cavity 40 along a longitudinal axis 48 of the central cavity 40 to the fully-inserted position of FIG. 2. Stated differently, the locking features interlock the base 28 to the fastener carrier 30 by snap fitting to one another. Any of various interlocking features may be used. In the embodiment shown, the base 28 includes a first locking feature 50 disposed at the central cavity 40 that is a notch 50 in the inner surface 52 of the body 32 at the central cavity 40 as best shown in FIGS. 6 and 7. The fastener carrier 30 has a second locking feature 54 configured for snap-fit engagement with the first locking feature 50 of the base 28 to retain the fastener carrier 30 to the base 28 (e.g., retain the fastener carrier 30 in the central cavity 40 of the base 28). In the embodiment shown, the second locking feature 54 is a protrusion 54 configured as an external rib projecting outward at (e.g., laterally outward from) an outer surface 56 of the fastener carrier 30 as best shown in FIGS. 3, 6, and 7. Referring to FIG. 2, the fastener carrier 30 includes a shoulder 55 that confronts a ledge 63 of the body 32 that narrows the central cavity 40 (see FIG. 1) to prevent further insertion of the fastener carrier 30 and establish a fully inserted position.

As shown in FIG. 3, the fastener insert 14 is aligned with the opening 16 in the composite sandwich panel 12 prior to insertion of the body 32 into the opening 16, as shown by the longitudinal axis 48 aligned over the opening 16 to allow the outer perimeter 36 of the body 32 to match a perimeter 58 of the opening 16 in the composite sandwich panel 12 (also referred to as a panel opening 16). As is evident in FIG. 3, the outer perimeter 36 of the body 32 of the base 28 is non-circular. In the specific embodiment shown, the outer perimeter 36 is a square or rectangle that has rounded corners. For example, in FIG. 3, the portion of the outer perimeter 36 not shown (e.g., extending into the page) is symmetrical with that shown. The perimeter 58 of the opening 16 is the same non-circular shape and matches the non-circular outer perimeter 36 of the body 32 of the base 28 (e.g., a square or rectangle that has rounded corners). The non-circular outer perimeter 36 engages the non-circular perimeter 58 of the opening 16, such as when torque is applied to thread a fastener to the fastener carrier 30, preventing rotation of the fastener carrier 30 that might otherwise occur if the panel opening 16 and the outer perimeter 36 of the body 32 were both circular.

The fastener insert 14 secures to the composite sandwich panel 12 at the opening 16 without potting, as shown in FIG. 2. More specifically, the base 28 has an interference feature 60 configured to mechanically engage the composite sandwich panel 12 when the fastener carrier 30 is snap-fit to the base 28 as best shown in FIG. 2. The engagement of the base 28 to the composite sandwich panel 12 resists withdrawal of the body 32 from the opening 16 in a direction opposite from a direction of insertion. For example, in FIGS. 1 and 2, the direction of insertion is the direction from the first skin 20 to the second skin 24, and the interference feature 60 resists withdrawal in a direction from the second skin 24 to the first skin 20.

Figure 4:
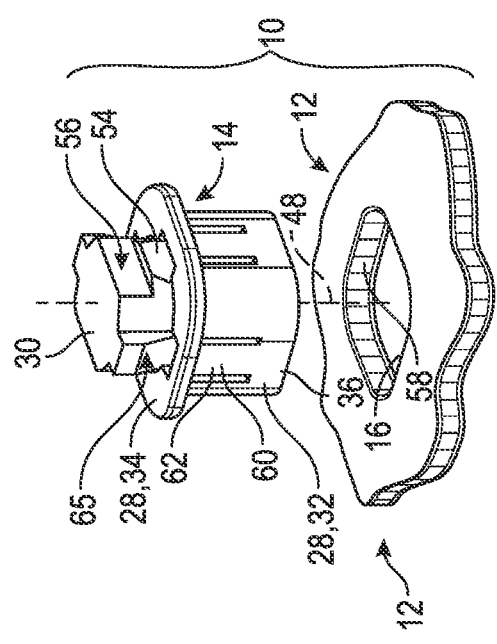
FIG. 4 is a perspective view of the fastener insert of FIG. 3 with the fastener carrier snap-fit to the base.

Referring to FIGS. 2, 4, and 5, the base 28 has two interference features that are arms 60 of the base 28. The arms 60 extend lengthwise at the outer perimeter 36 of the body 32. Each of the arms 60 has a free end 62 disposed proximate to the flange 34. The arms 60 are flexible in that the material of the arms 60 biases them to the positions shown in FIG. 3, but they flex laterally outward upon interference with the fastener carrier 30 fully inserted in the central cavity 40, as shown in FIG. 2. The fastener carrier 30 has a ramped surface 65 disposed adjacent inner sides of each of the arms 60. The ramped surface 65 widens the fastener carrier 30 sufficiently wide in the lateral direction (e.g., a transversely outward direction orthogonal to the longitudinal axis 48) that the ramped surface 65 interferes with the free end 62 of each of the arms 60 to flex the arms 60 laterally outward when the fastener carrier 30 is inserted into the central cavity 40. When flexed laterally outward, the free end 62 is forced laterally outward of the central cavity 40 into the core 18, interfering with the core 18. Additionally, the first skin 20 is disposed between the free end 62 and the flange 34 when the fastener carrier 30 is fully inserted, as best shown in FIG. 2. Stated differently, the arms 60 remain in the laterally-outward flexed positions of FIG. 2 due to the ramped surface 65 of the fastener carrier 30, and the first skin 20 is trapped between the arms 60 and the flange 34. Accordingly, the fastener insert 14 is held to the composite sandwich panel 12 at the trapped portion of the first skin 20. In FIGS. 4 and 5, the composite sandwich panel 12 is not shown so that the laterally-outward flexing arms 60 are visible. The flange 34 may rest directly on the exterior of the first skin 20, or indirectly, with a washer or other component between the flange 34 and the exterior of the first skin 20.

FIG. 8 is a perspective view of the panel assembly 10 of FIG. 1 including two of the non-potted fastener inserts 14 of FIG. 1 secured to the composite sandwich panel 12 of FIG. 1 without potting. In FIG. 8, the panel assembly 10 is inverted relative to the view in FIG. 2 so that the second skin 24 faces upward in FIG. 8, and the fastener openings 42 are visible. In FIG. 8, the fastener inserts 14 are held in the openings 16 of the composite sandwich panel 12 by the interference features (arms 60) even though the flanges 34 are at the bottom of the assembly 10 as positioned in FIG. 8. Stated differently, the laterally-outward flexed arms 60 ensure that the fastener inserts 14 need not be otherwise supported and do not fall out of the openings 16 before the fasteners 44 are threaded to the fastener carriers 30.

Figure 9:
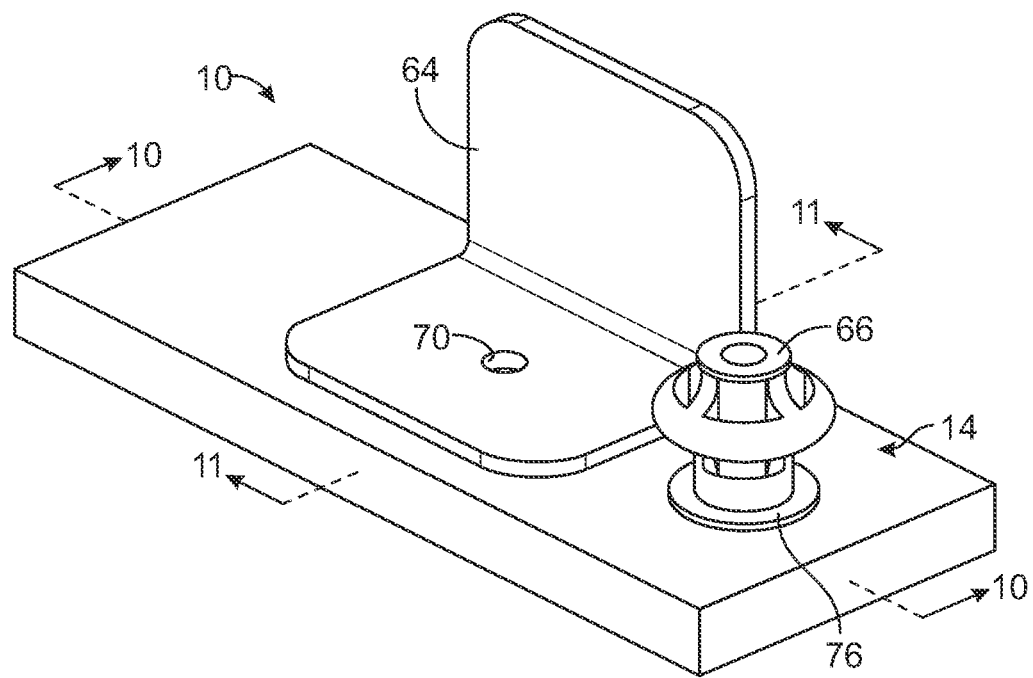
FIG. 9 is a perspective view of the panel assembly of FIG. 8 with components secured to the composite sandwich panel by fasteners at the fastener inserts.
Figure 10:
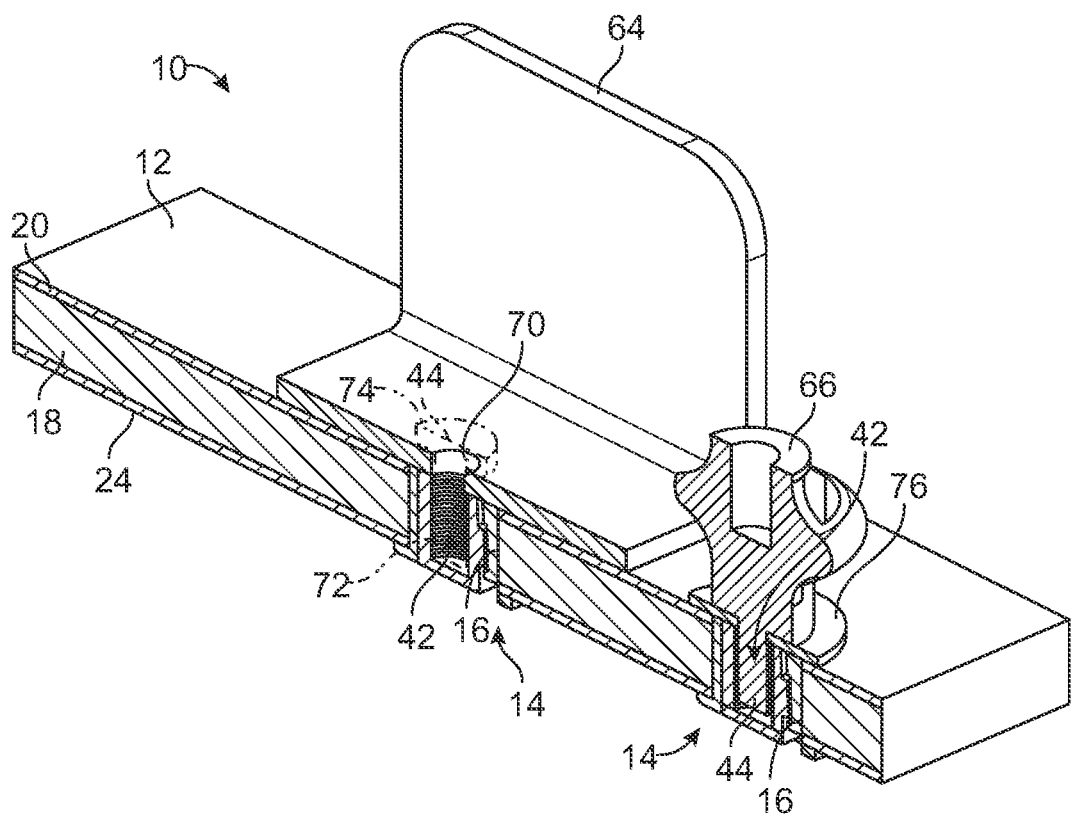
FIG. 10 is a cross-sectional view of the panel assembly of FIG. 9 taken at lines 10-10 in FIG. 9.
Figure 14:
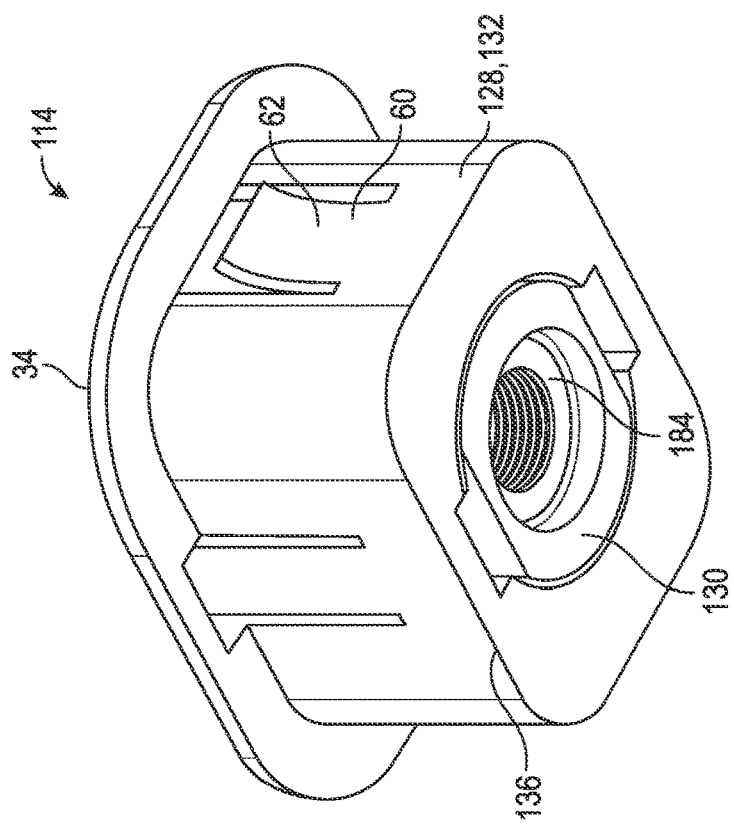
FIG. 14 is another perspective view of the fastener insert of FIG. 13.
Figure 13:
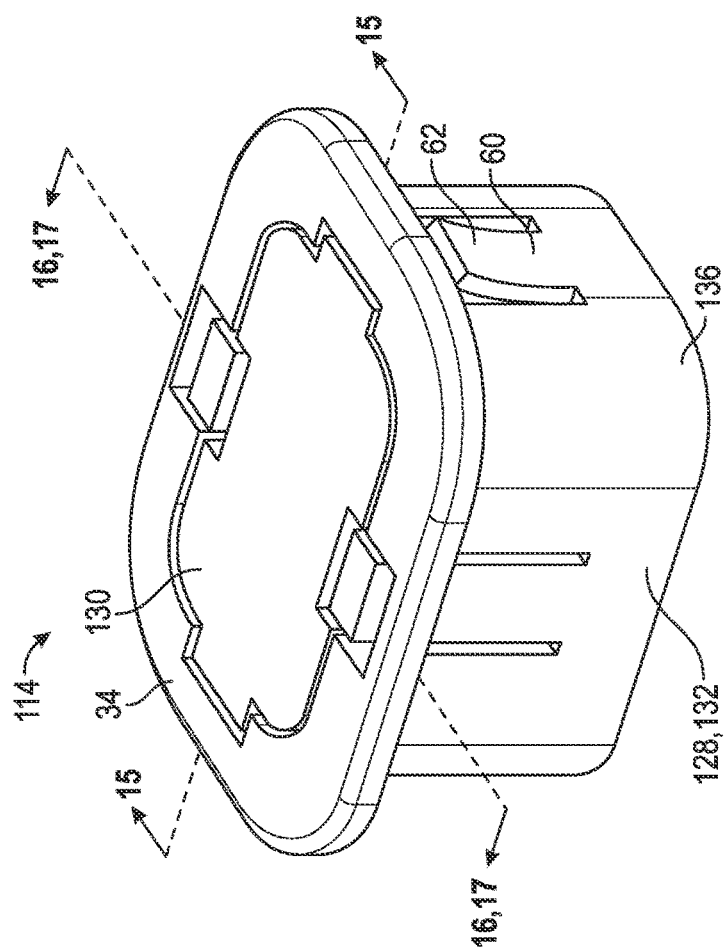
FIG. 13 is a perspective view of a second embodiment of a non-potted fastener insert having a base and a fastener carrier snap-fit to the base.

FIG. 9 is a perspective view of the panel assembly 10 of FIG. 8 with components 64, 66 aligned with the fastener openings 42 of the fastener inserts 14 (fastener openings 42 visible in the cross-section of FIG. 10) in the composite sandwich panel 12. FIG. 10 is a cross-sectional view of the panel assembly of FIG. 9 taken at lines 10-10 in FIG. 9 and shows fasteners 44 threaded to the fastener inserts 14 to secure the components 64, 66 to the composite sandwich panel 12 (fastener 44 at the component 64 shown in phantom). FIG. 11 is cross-sectional view of the panel assembly 10 of FIG. 9 taken at lines 11-11 in FIG. 9. More specifically, the components are shown as a bracket 64 and a threaded post 66 which may be used for supporting still other components not shown, such as air conduits or reading light wiring in many aircraft interior applications, for example. The bracket 64 has an opening 70 aligned with the fastener opening 42 and sized to receive a threaded shank 72 of the fastener 44 while a head 74 of the fastener 44 is disposed at and may rest directly or indirectly on the bracket 64. At the other fastener insert 14, a washer 76 is first mounted at the composite sandwich panel 12 at the opening 16 and the fastener 44 of the threaded post 66 rests on and traps the washer between the post 66 and the composite sandwich panel 12. This helps to stabilize the threaded post 66 at the fastener insert 14 as the threaded post 66 may be smaller in width or diameter than the width of the panel opening 16, but the washer 76 is wider than the panel opening 16, so that forces on the threaded post 66 will be reacted by the washer 76 interfacing with the composite sandwich panel 12.

FIG. 12 shows another panel assembly 10A configured with a composite sandwich panel 112, and multiple fastener inserts 14 as described. The composite sandwich panel 112 is configured the same as composite sandwich panel 12, but is contoured and has additional panel openings 16. As shown, some of the fastener inserts 14 are secured to the composite sandwich panel 112 so that the fastener opening 42 is accessible at the second skin or second side 25 (e.g., they are inserted in a direction from the first skin 20 (not shown in FIG. 12) to the second skin 24), while others of the fastener inserts 14 are secured to the composite sandwich panel 12 so that the fastener opening 42 is accessible at the first skin 20 of first side 23 (e.g., they are inserted in a direction from the second skin 24 to the first skin 20). Accordingly, components such as brackets 64 and threaded posts 66 shown in FIGS. 9 and 10 may be installed at both sides of the composite sandwich panel 112 via the fastener inserts 14 having openings 42 opening at different sides of the composite sandwich panel 112. Additionally, the composite sandwich panel 112 is contoured. Trim pieces 80 are shown sealing the edges of the panel assembly 10A. Another support bracket 82 is shown mounted to the trim piece 80 for supporting other components not shown, such as air conduits or reading light wiring in many aircraft interior applications, for example.

With reference to FIGS. 1-11, a method 1000 of fastening a component to a composite sandwich panel is shown in Table I and is discussed with respect to the composite sandwich panel assembly 10.

TABLE I

| 1000 - Method of Fastening a Component to a Composite Sandwich Panel | |
|---|---|
| 1100 | Insert fastener insert in opening in composite sandwich panel |
| 1200 | Force fastener carrier into central cavity of base |
| 1300 | Optional - Mount washer at opening in composite sandwich panel |
| 1400 | Align opening in component with opening in composite sandwich panel |
| 1500 | Insert fastener through opening in component and into fastener opening in fastener carrier |
| 1600 | Optional - Thread fastener to the fastener carrier |
| 1600A | Optional - Thread fastener to threaded nut |

The method 1000 includes block 1100, inserting the fastener insert 14 through the opening 16 in the composite sandwich panel 12 in a direction from the first side 22 to the second side 26 of the composite sandwich panel 12 so that the flange 34 is disposed at and may rest directly or indirectly on the first skin 20 of the composite sandwich panel 12. For some embodiments in which the opening in the composite sandwich panel is circular, a projection from the flange may also be inserted into a second opening in the composite sandwich panel, such as discussed with respect to FIGS. 33-37. Next, the method 1000 includes block 1200, forcing the fastener carrier 30 into the central cavity 40 of the base 28 from the first side 22 of the composite sandwich panel 12 to mechanically engage the fastener carrier 30 with the base 28 (e.g., by snap-fitting the first and second locking features 50, 54 to one another). For example, forcing the fastener carrier 30 may be by pushing the fastener carrier 30. Forcing the fastener carrier 30 to snap-fit the fastener carrier 30 to the base 28 simultaneously engages the interference feature (e.g., arm 60 or multiple arms 60) of the base 28 with the composite sandwich panel 12 to resist withdrawal of the body 32 from the opening 16 in the composite sandwich panel 12 in a direction opposite from the direction of insertion.

Optionally, for some components, the method 1000 may include block 1300, mounting a washer 76 at the opening 16 in the panel assembly 10 prior to inserting the fastener 44 through the opening 16. The method 1000 may include block 1400, aligning an opening in the component (such as the opening 70 in bracket 64) with the fastener opening 42, and block 1500, inserting a fastener 44 through the opening 70 in the component (e.g., bracket 64) and into the fastener opening 42 to secure the component 64 to the composite sandwich panel 12. In the embodiment shown, inserting the fastener 44 is from the second side 26 of the composite sandwich panel 12 (e.g., the side opposite from the flange 34). However, the interference feature (arms 60) and the flange 34 trapping the first skin 20 prevent the fastener insert 14 from being pushed out of the opening 16 in the composite sandwich panel 12 during this action.

In some embodiments such as that of FIGS. 1-11, the fastener carrier 30 is threaded, and the method 1000, may include block 1600, threading the fastener 44 to the fastener carrier 30. Due to the complementary non-circular panel opening 16 and non-circular outer perimeter 36 of the fastener insert 14, the torque applied to the fastener 44 during threading does not cause rotation of the fastener insert 14 relative to the composite sandwich panel 12.

The method 1000 described with respect to FIGS. 1-11 applies equally to the panel assembly 10A of FIG. 12, except that, in addition to the fastener insert 14 inserted in to an opening 16 in a direction from the first skin 20 to the second skin 24, there is at least one fastener insert 14 that is inserted through one of the openings 16 in the composite sandwich panel 112 in a direction from the second skin 24 to the first 20 so that the flange 34 is disposed at and may rest directly or indirectly on the second skin 24 of the composite sandwich panel 112. Accordingly at least one fastener opening 42 opens at the first skin 20 and at least one fastener opening 42 opens at the second skin 24.

Referring to FIGS. 13-17, a second embodiment of a fastener insert 114 is shown that may be secured to the composite sandwich panel 12 at the panel opening 16 without potting, as shown in FIG. 15. The fastener insert 114 has many of the same features as the fastener insert 14, and those features are referred to with like reference numbers and the same discussion of those features with respect to fastener insert 14 applies equally to fastener insert 114. The fastener insert 114 includes a base 128 like base 28 except slightly larger and with two first locking features 50 (e.g., two notches 50 at the inner surface of the body at the central cavity 40 (see FIG. 16)). A body 132 of the base 128 has a non-circular outer perimeter 136 shaped like outer perimeter 36, but may be slightly larger in overall dimension than outer perimeter 36 to accommodate the larger fastener carrier 130 discussed herein. As such, a non-circular panel opening 16 would also be larger to receive the body 132.

The fastener insert 114 includes a fastener carrier 130 like fastener carrier 30 except with two second locking features 54 (see FIG. 16) and with an opening 142 shaped differently than fastener opening 42 in order to retain a threaded nut 184. As shown in FIG. 16, two external protrusions 54 project outward at the outer surface of the fastener carrier 130, one interlocking with base 128 at one of the notches 50, and the other interlocking with the base 128 at the other notch 50. Alternatively, only one notch 50 and one protrusion 54 may be included in the fastener insert 114, and the fastener insert 14 could have two notches 50 and two protrusions 54 instead of only one notch 50 and one protrusion 54. In the fully inserted, snap-fit position of FIG. 15, the fastener insert 114 is flush with the second skin 24.

As shown in FIG. 15, the fastener carrier 130 has an end wall 186 opposite an entrance 188 of the fastener opening 142. The fastener opening 142 is wider at the end wall 186 than at the entrance 188. The fastener insert 114 includes the internally threaded nut 184 that has threads 46 to thread to a threaded fastener 44 like that shown in FIG. 10. The threaded nut 184 is disposed in the fastener opening 142 between the entrance 188 and the end wall 186, and has a laterally extending flange 190 wider than the entrance 188 so that the threaded nut 184 is retained in the fastener opening 142 without being coupled to the fastener carrier 130. Stated differently, the threaded nut 184 can move within the fastener opening 142 but cannot be withdrawn therefrom. For example, during assembly of the fastener carrier 130, the threaded nut 184 may be placed within the opening 142 and then the end wall 186 may be bonded or welded to the body 132 to trap the threaded nut 184 in the opening 142. Accordingly, during the method of fastening the component 64 or 66 to the composite sandwich panel 12 using the fastener insert 114 would include inserting a fastener through the opening in the component and into the threaded nut 184 and, instead of block 1600, block 1600A, threading the fastener to the threaded nut 184 to secure the component to the composite sandwich panel 12.

FIGS. 18-21 show a third embodiment of a fastener insert 214 that may be secured to the composite sandwich panel 12 at a non-circular panel opening 216 without potting, as shown in the panel assembly of FIG. 21. The fastener insert 214 is not threaded, and is instead configured with a fastener carrier 230 that has a fastener opening 242 that is a through hole enabling a fastener to pass entirely through the fastener insert 214, and may be a countersunk fastener that may be threaded at a different portion than the portion that extends through the fastener carrier 230.

The fastener insert 214 has many of the same features as the fastener insert 14, and those features are referred to with like reference numbers and the same discussion of those features with respect to the fastener insert 14 applies equally to the fastener insert 214. FIG. 18 is an exploded perspective view of the fastener insert 214 having a base 228 and a fastener carrier 230 that snap-fits to the base 228 as best shown in FIG. 20. The base 228 includes a body 232 defining a central cavity 240 that extends entirely through the base 228, and also includes a flange 34 integral with the body 232. The body has a non-circular outer perimeter 236 that is shown as oval. FIG. 19 is a perspective view of the fastener insert 214 of FIG. 18 showing the fastener carrier 230 fully inserted into the central cavity 240 and snap-fit to the base 228.

As best shown in FIG. 20, the body 232 of the base 228 has a first locking feature 250 that is a protrusion 250 protruding from an inner surface 252 of the body 232 into the central cavity 240. In fact, the body 232 has two such protrusions 250 extending opposite from one another, and each extending partway around the inner surface 252 in a laterally-inward direction and generally transverse to the longitudinal axis 48 of the central cavity 240. The protrusions 250 are configured as lateral ribs.

The fastener carrier 230 has a second locking feature 254 that is a channel 254 facing laterally outward at an outer surface 256 of the fastener carrier 230. When the fastener carrier 230 is inserted into the central cavity 240, a ramped leading edge 257 of the fastener carrier 230 pushed past each protrusion 250 and the protrusions 250 then extend into the channels 254 when the fastener carrier 230 is fully inserted with a shoulder 55 of the fastener carrier 230 resting on a ledge 63 of the body 232. The fastener carrier 230 defines a longitudinal slot 259 best shown in FIGS. 18 and 20 that extends lengthwise partway through the fastener carrier 230 from an insertion end 261 of the fastener carrier 230. The longitudinal slot 259 bifurcates the insertion end 261, enabling laterally inward deflection of the two portions of the fastener carrier 230 at the insertion end 261 when the ramped leading edges 257 at insertion end 261 encounter the protrusions 250, so that the insertion end 261 of the fastener carrier 230 can move past the protrusions 250 until the protrusions 250 extend into the channels 254. In the fully inserted snap-fit position of FIG. 21, the fastener insert 214 is flush with the second skin 24.

FIGS. 19 and 21 show the arms 60 extending lengthwise at the outer perimeter 236 of the body 232, and having free ends 62 that flex laterally outward when the ramped surfaces 65 of the fastener carrier 230 are disposed adjacent inner sides of each of the arms 60. In FIG. 21, the first skin 20 is shown trapped between the flange 34 and the free ends 62. The fastener carrier 230 has a concave recess 243 at the end 245 of the fastener carrier 230 opposite the insertion end 261. The concave recess 243 is countersunk relative to the end 245 for receiving a head of a countersunk fastener. This may enable the head to be flush with the flange 34.

FIG. 22 is another embodiment of a fastener insert 314 alike in all aspects to fastener insert 214 including the base 228. A fastener carrier 330 that snap-fits to the base 228 in the same manner that fastener carrier 230 snap-fits to base 228. Fastener carrier 330 is alike in all aspects to fastener carrier 230 except that the fastener carrier 330 does not include the concave recess 243, and so would likely be used with a fastener 44 that has a non-countersunk head.

FIG. 23 is an exploded perspective view of a fifth embodiment of a non-potted fastener insert 414 having a base 428 and a fastener carrier 430 that snap-fits to the base 428. In FIG. 24, the fastener insert 414 is shown in a panel assembly 410 supported on and secured to the composite sandwich panel 12 and just prior to snap-fitting the fastener carrier 430 to the base 428. FIG. 25 is a cross-sectional illustration of the panel assembly 410 of FIG. 24 showing the fastener insert 414 secured to the composite sandwich panel 12 without potting after snap-fitting the fastener carrier 430 to the base 428. Like the base 28, the base 428 includes a body 432 and a flange 434 integral with the body 432 and protruding laterally-outward from an outer perimeter 436 of the body 432. The body 432 has the same non-circular outer perimeter 436 as the non-circular perimeter 58 of the non-circular opening 416 and corresponds with and engages the composite sandwich panel 12 at the non-circular opening 416. Stated differently, the shape of the non-circular outer perimeter 436 is the same as the shape of the non-circular perimeter, and the body 432 fills the opening 416. The base 428 defines a central cavity 440 extending through the base 428 as a through hole.

In order for the base 428 to secure to the composite sandwich panel 12, instead of flexible arms 60 with free ends 62 disposed adjacent the flange 434, the base 428 includes four arms 460 extending lengthwise at the outer perimeter 436 of the body 432. There are four equally-spaced arms 460, and three are visible in FIG. 23. Each of the arms 460 has a free end 462 disposed at an end of the body 432 opposite from the flange 434. A laterally-outward extending lip 435 is disposed at the free end 462 of each arm 460. A ramped outer surface 467 at each free end 462 aides in sliding the fastener carrier 430 in the central cavity 440 in a direction from the first skin 20 to the second skin 24. When the fastener carrier 430 is fully inserted, the lip 435 extends laterally outward of the opening 16 in the composite sandwich panel 12 and interfaces with an exterior of the second skin 24 (e.g., the skin 24 opposite from that on which the flange 434 rests), holding the fastener insert 414 to the composite sandwich panel 12 with the lip 435 and the flange 34 at the opposing sides of the composite sandwich panel 12. Accordingly, the base 428 extends past both panel skins 20, 24 when inserted through the opening 416, and is not flush with the composite sandwich panel 12.

The fastener carrier 430 is inserted into a central cavity 440 of the base 428 in a direction from the first side 23 to the second side 25 (e.g., from the first skin 20 to the second skin 24). The central cavity 440 extends entirely through the base 428 as a through hole. As best shown in FIG. 24, the body 432 of the base 428 has a first locking feature 450 that is a protrusion 450 protruding from an inner surface 452 of the arm 460 of the body 432 into the central cavity 440. In fact, the body 432 has four such protrusions 450 (three visible in FIG. 24) one on each arm 460 and spaced apart from one another, and each extending partway around the inner surface 452 in a laterally-inward direction and generally transverse to the longitudinal axis 48 of the central cavity 440.

The fastener carrier 430 has a second locking feature 454 that is a channel 454 facing laterally outward at an outer surface 456 of the fastener carrier 430 (see FIG. 23). There are four channels 454, one corresponding with each of the protrusions 450. When the fastener carrier 430 is inserted into the central cavity 440, a ramped leading edge 457 of the fastener carrier 430 adjacent each arm 460 pushes past the rib 450, which may temporarily bow the arms 460 laterally outward into the core 18. The protrusion 450 then extends into the adjacent channel 454 when the fastener carrier 430 is fully inserted, the fastener carrier 430 snap-fitting to the base 428 by sliding past the protrusion 450 so the protrusion 450 is in the channel 454. The fastener carrier 430 has four spaced shoulders 455 (visible in FIG. 23 and two visible in FIG. 25), and each equally spaced about the fastener carrier 430 opposite the insertion end that has the leading edge 457. The body 432 has four spaced ledges 463 (see FIG. 23 in which two are visible), with each shoulder 455 resting on a ledge 463 when the fastener carrier 430 is fully inserted. A ledge 469 formed at the bottom of each channel 454 (see FIG. 25) interferes with the protrusion 450 to prevent the fastener carrier 430 from being withdrawn from the base 428 in a direction from the second skin 24 to the first skin 20, and the ledges 463 interfere with the shoulders 455 to prevent the fastener carrier 430 from being pushed out of the body 432 in a direction from the first skin 20 to the second skin 24.

A fastener opening 442 in the fastener carrier 430 is a threaded, blind hole that opens at the same side of the fastener insert 414 as the flange 434 (e.g., at the same side of the composite sandwich panel 12 as the first skin 20). When a fastener, such as either fastener 44 in FIG. 10, is fastened to the fastener carrier 430 at threads 46, the base 428 with the non-circular outer perimeter 436 cannot rotate relative to the composite sandwich panel 12 at the non-circular opening 416 under torque applied by tightening the fastener 44.

Figure 32:
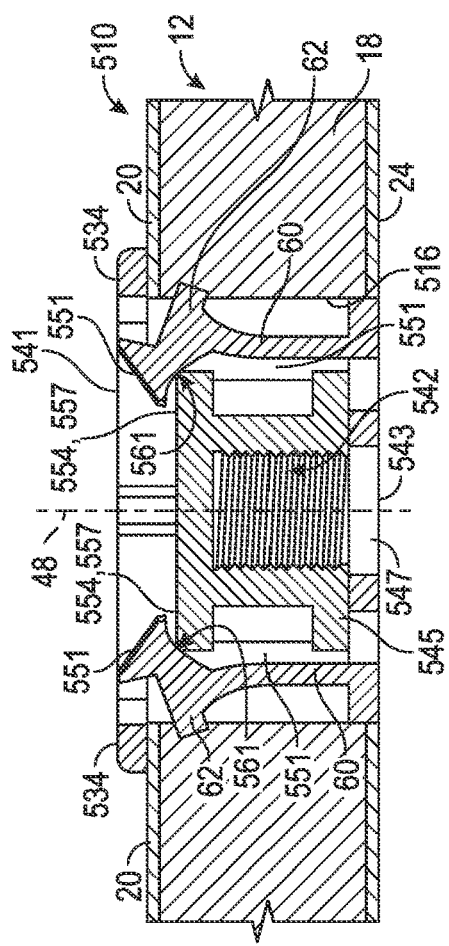
FIG. 32 is a cross-sectional illustration showing a panel assembly including the fastener insert of FIG. 31 secured to a composite sandwich panel without potting after snap-fitting the fastener carrier to the base.
Figure 35:
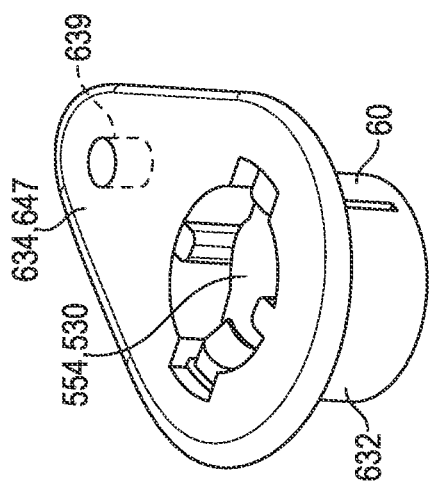
FIG. 35 is a perspective view of the fastener insert of FIG. 33 showing the fastener carrier snap-fit to the base.
Figure 34:
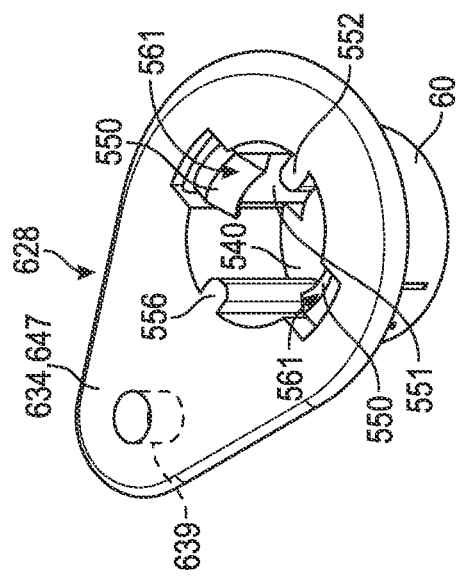
FIG. 34 is a perspective view of the base of FIG. 33.

FIGS. 26-32 show a sixth embodiment of a fastener insert 514 that may be secured to the composite sandwich panel 12 at a panel opening 516 in a panel assembly 510 as shown at FIG. 32. The fastener insert 514 has many of the same features as the fastener insert 14, and those features are referred to with like reference numbers and the same discussion of those features with respect to fastener insert 14 applies equally to fastener insert 514. The fastener insert 514 includes a base 528 that has a body 532 with a non-circular outer perimeter 536 and an integral flange 534 extending laterally outward from the body 532. A non-circular panel opening 516 in FIG. 32 has a perimeter that is the same shape as outer perimeter 536 to receive the body 532.

Referring to FIGS. 27-32, the base 528 has two interference features that are arms 60 extending lengthwise at the outer perimeter 536 of the body 532 as described with respect to arms 60 in FIG. 5, for example. Each of the arms 60 has a free end 62 disposed proximate to the flange 534 when the fastener carrier 530 is fully inserted in the base 528. The first skin 20 is disposed between the free end 62 and the flange 534 when the fastener carrier 530 is fully inserted, as best shown in FIG. 32. Stated differently, the arms 60 remain in the laterally-outward flexed positions of FIG. 32 due to the fastener carrier 530, and the first skin 20 is trapped between the arms 60 and the flange 534.

Figure 27:
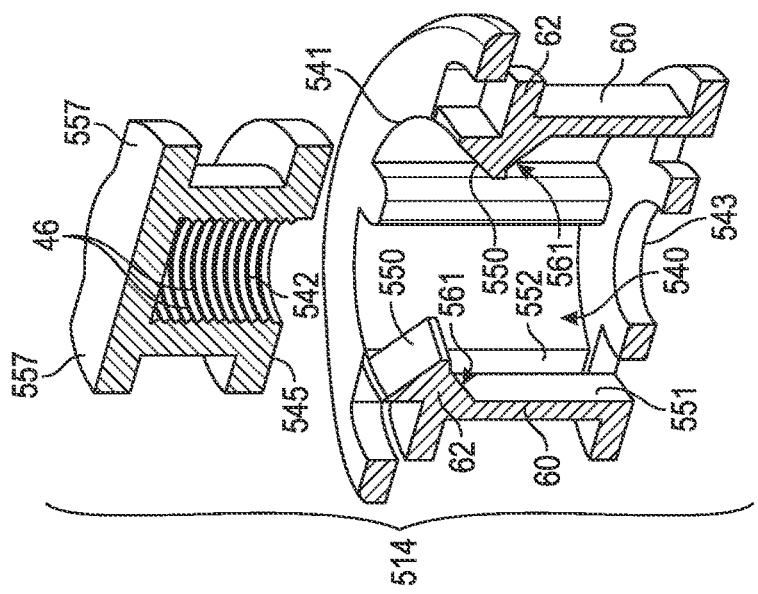
FIG. 27 is a cross-sectional perspective view of the fastener insert of FIG. 26 taken at lines 27-27 in FIG. 26.

The base 528 defines a central cavity 540 that is a through hole with an insertion end 541 (e.g., a first opening) at the flange 534 and an opposite exit end 543 (e.g., a second opening (see FIG. 27). The fastener insert 514 includes a fastener carrier 530 with a fastener opening 542 that is a blind hole similar to fastener opening 42 and that has threads 46 to which a fastener 44 may be threaded. The central cavity 540 has a narrowed portion (e.g., at exit opening 547) between the insertion end 541 and the exit end 543. The leading end 545 of the fastener carrier 530 is wider than a narrowed portion of the central cavity 540 at the exit end 543 so that the leading end 545 of the fastener carrier 530 is supported by the body 532 at the exit end 543 when fully inserted into the base 528 as in FIG. 32.

The fastener carrier 530 is configured to snap-fit to the base 528 when inserted in a direction along the longitudinal axis 48 from the first skin 20 to the second skin 24. The base 528 has a first locking feature 550 at each of the arms 60 that is a protrusion 550 protruding laterally inward into the central cavity 540. Accordingly, the base 528 has a plurality of protrusions 550 spaced axially apart from the exit end 543 to extend over and interfere with an end 554 of the fastener carrier 530 when the fastener carrier is inserted into the central cavity 40. The second locking feature of the fastener carrier 530 is therefore the end 554 of the fastener carrier 530 (e.g., a flange extending at the end).

Each of the arms 60 has a ramped interior surface 561 that projects inward toward the longitudinal axis of the central cavity 540 so that the fastener carrier 530 interferes with the ramped interior surface 561 to flex and hold the arms 60 laterally outward when the fastener carrier 530 is inserted into the central cavity 540. Additionally, the width of the fastener carrier 530 at the end 554 is sufficiently wide to maintain the laterally outwardly flexed position of the arms 60, with the arms engaging the core 18 and trapping the first skin 20 between the flange 534 and the free ends 62 of the arms 60 as described.

Figure 28:
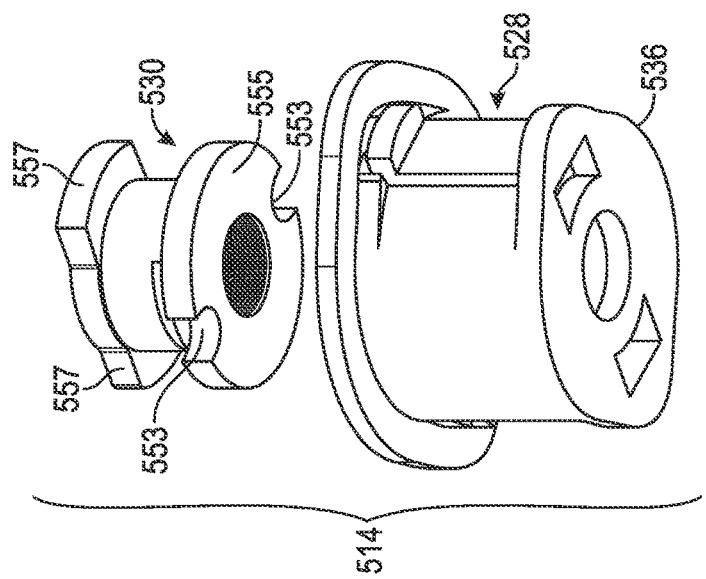
FIG. 28 is another exploded perspective view of the fastener insert of FIG. 26.
Figure 26:
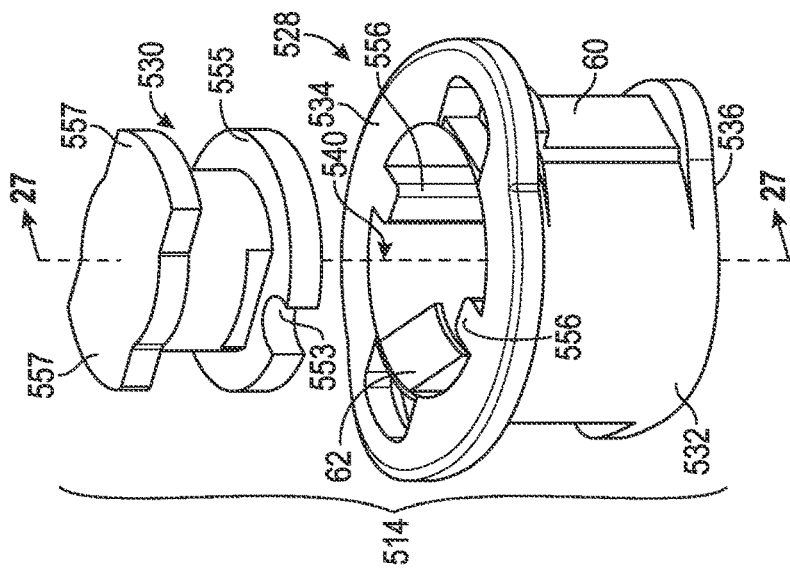
FIG. 26 is an exploded perspective view of a sixth embodiment of a non-potted fastener insert having a base and a fastener carrier that snap-fits to the base.
Figure 29:
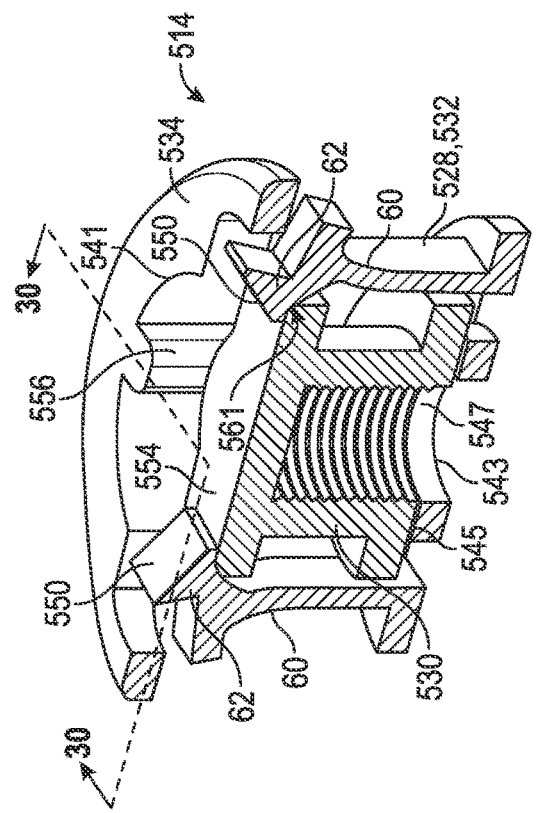
FIG. 29 is a cross-sectional view of the fastener insert of FIG. 27 showing the fastener carrier snap-fit to the base.
Figure 30:
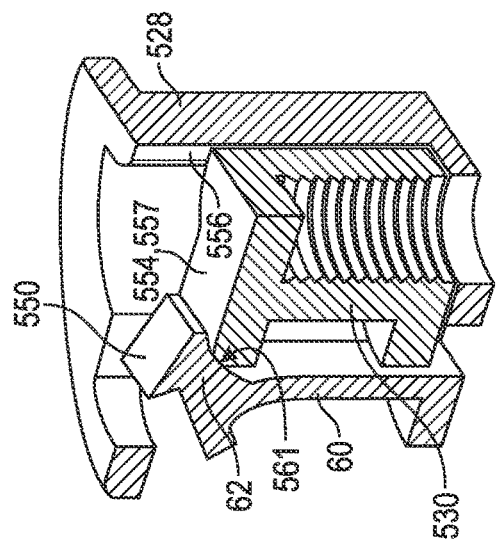
FIG. 30 is a cross-sectional view of the fastener insert of FIG. 29 taken at lines 30-30 in FIG. 29.
Figure 31:
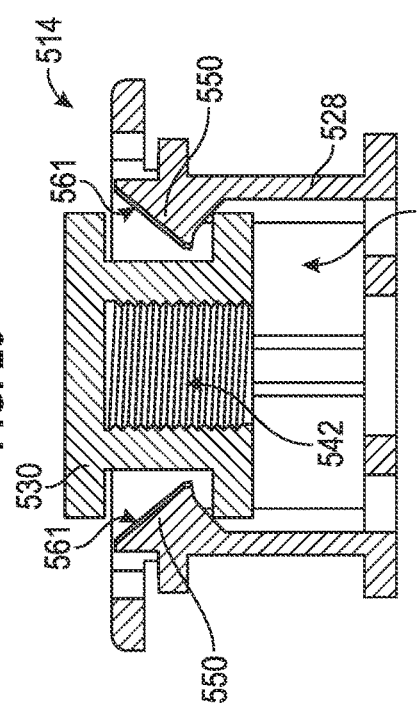
FIG. 31 is a cross-sectional view of the fastener insert of FIG. 29 just prior to snap-fitting the fastener carrier to the base.

Referring to FIG. 27, a notch 551 in the inner surface of the body 532 at the central cavity 540 may be considered another locking feature of the body 532. The protrusion 550 helps to define one end of the notch 551, and side walls 552 extending along sides of the notch 551 further define the notch (one side wall shown in FIG. 27, and another side wall is symmetrically disposed at the other side of the notch 551). Referring to FIGS. 26 and 28, the fastener insert 530 has two notches 553 at an end flange 555. The body 532 has two vertical rails 556 (see FIG. 26) extending longitudinally in the central cavity 540 and configured to rest in the notches 553 and prevent rotation of the fastener carrier 530 relative to the base 528. The interfitting notches 553 and rails 556 also help to keep narrowed side flanges 557 at an opposite end flange 555 of the fastener carrier 530 disposed within the notches 551. The notches 553 may also be referred to as first locking features, and the side flanges 557 may be referred to as second locking features disposed within the notches 553. The protrusions 550, end 554, side flanges 557 and notches 551 are all shown interfitting with one another in FIG. 32 and with the fastener insert 514 flush with the second skin 24 when fully inserted.

Figure 37:
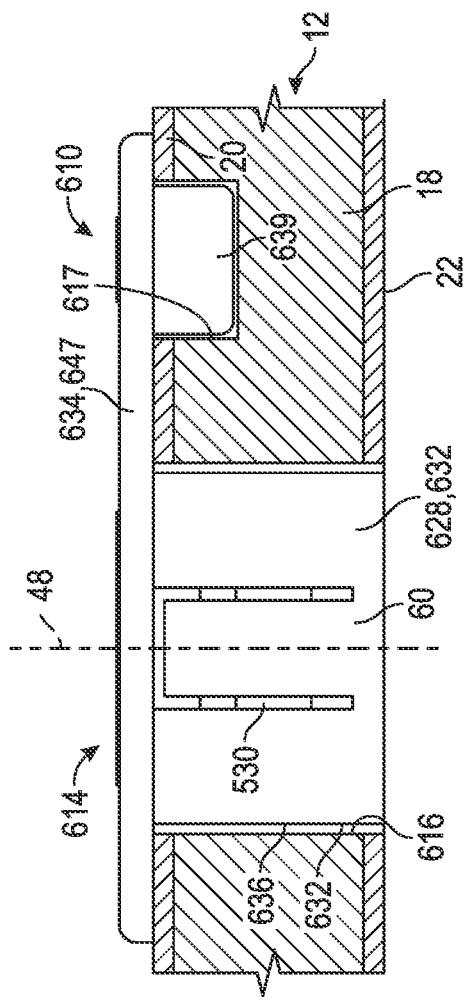
FIG. 37 is a panel assembly sowing a side view of the fastener insert of FIG. 36 and a composite sandwich panel shown in fragmentary cross-sectional view.
Figure 33:
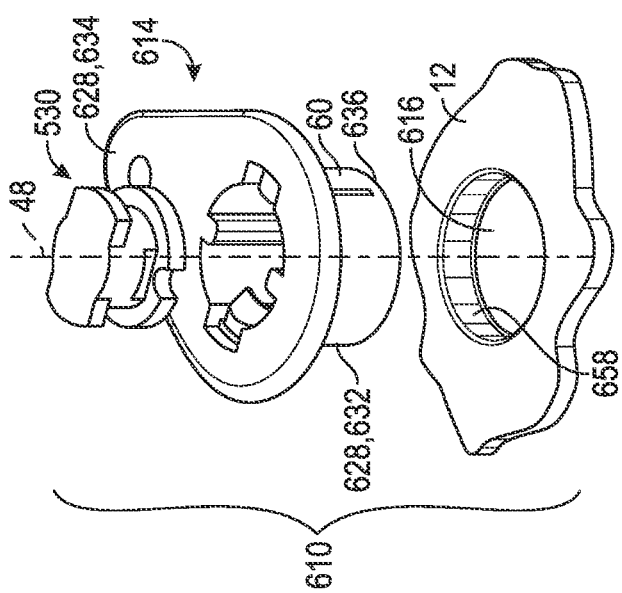
FIG. 33 is an exploded perspective view of a panel assembly with a seventh embodiment of a non-potted fastener insert having a base and a fastener carrier that snap-fits to the base, and the fastener insert secures to a composite sandwich panel at two openings.
Figure 36:
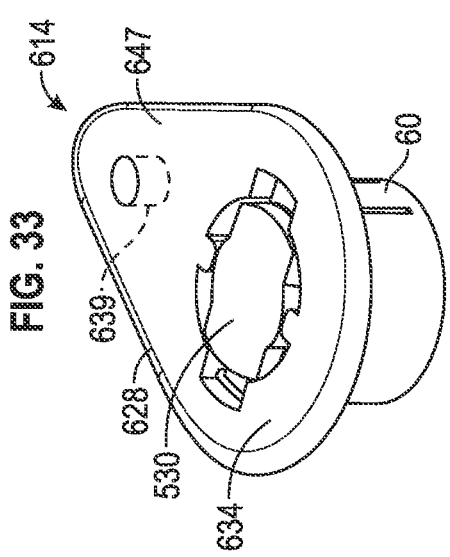
FIG. 36 is a perspective view of the fastener insert of FIG. 33 just prior to snap-fitting the fastener carrier to the base.

FIGS. 33-37 show a seventh embodiment of a non-potted snap-fit fastener insert 614 that may be secured to the composite sandwich panel 12 at a circular panel opening 616 in a panel assembly 610 as shown at FIG. 37. The fastener insert 614 includes a base 628 that has a body 632 with a circular outer perimeter 636 and an integral flange 634 extending laterally outward from the body 632. The circular panel opening 616 has a perimeter 658 that is the same shape as outer perimeter 636 to receive the body 632 as in FIG. 37. The composite sandwich panel is shown in a cross-sectional view in FIG. 37 and the fastener insert 614 is not in a cross-sectional view.

The fastener insert 614 includes the same fastener carrier 530 as described with respect to the fastener insert 514. Additionally, the base 628 includes some of the same features as base 528, including the same central cavity 540, vertical rails 556, and the same locking features (e.g., protrusions 550 with ramped surfaces 561, and notches 551 (one shown)), and the same interference feature (laterally-outward flexing arms 60 that engage the composite sandwich panel 12 as discussed with respect to FIG. 32). Accordingly, the fastener carrier 530 is configured to snap-fit to the base 628 when inserted in a direction along the longitudinal axis 48 from the first skin 20 to the second skin 24.

Because the outer perimeter 636 of the body 632 as well as the perimeter 658 of the opening 616 are circular, the flange 634 is extended on one side such that it is asymmetrical, and the base includes a projection 639 extending from an elongated side 647 of the flange 634 and spaced laterally apart from and parallel with the longitudinal axis 48 of the central cavity 540. As shown in FIG. 37, the composite sandwich panel 12 may include a second opening 617 spaced from the first circular opening 616 and configured to receive the projection 639. The second opening 617 is shown as a blind hole at the first skin 20, but could instead be a through hole. Accordingly, even though the fastener opening 616 and the perimeter 636 are circular, with the flange 634 anchored to the composite sandwich panel 12 at two locations (e.g., at openings 616 and 617), torque applied on the fastener insert 614 such as when tightening a fastener in the fastener opening 42 of the fastener carrier 530 (fastener opening 42 shown only in FIG. 27), the fastener insert 614 will be prevented from rotation relative to the composite sandwich panel 12.

The various embodiments of fastener inserts disclosed herein secure to a composite sandwich panel without potting, resist pull out and push out during a period in which they are installed to the panel but before a component is secured to the panel with a fastener at the fastener insert, and also resist rotation relative to the panel during fastening. The fastener inserts may reduce production time in comparison to potted fastener inserts due to the much quicker securement to the panel by interference features in comparison to potting, and the quick securement of the fastener carrier to the base by snap-fit engagement.

The following Clauses provide example configurations of fastener inserts, panel assemblies, and methods of fastening a component to a composite sandwich panel as disclosed herein.

Clause 1. A fastener insert for securement to a composite sandwich panel at an opening in the composite sandwich panel, the fastener insert comprising: a base having a body and a flange integral with the body, the flange extending laterally outward of an outer perimeter of the body, the base defining a central cavity extending entirely through both the body and the flange, and the base including a first locking feature disposed at the central cavity; and a fastener carrier configured to insert into the central cavity of the base, the fastener carrier defining a fastener opening and having a second locking feature configured for mechanical engagement with the first locking feature of the base to retain the fastener carrier to the base.

Clause 2. The fastener insert of clause 1, wherein: the first locking feature of the base is a notch in an inner surface of the body at the central cavity; the second locking feature of the fastener carrier is a protrusion projecting outward at an outer surface of the fastener carrier; and the protrusion extends into the notch.

Clause 3. The fastener insert of clause 1, wherein: the first locking feature of the base is a protrusion protruding from an inner surface of the body into the central cavity; the second locking feature of the fastener carrier is a channel facing laterally outward at an outer surface of the fastener carrier; and the protrusion extends into the channel.

Clause 4. The fastener insert of clause 3, wherein the fastener carrier defines a longitudinal slot extending lengthwise partway through the fastener carrier from an insertion end of the fastener carrier, the longitudinal slot bifurcating the insertion end of the fastener carrier, enabling laterally inward deflection of the insertion end when the insertion end encounters the protrusion during insertion of the fastener carrier into the base.

Clause 5. The fastener insert of clause 1, wherein: the central cavity has a first opening at the flange and an opposite second opening; an insertion end of the fastener carrier is wider than the second opening so that the fastener carrier is supported by the body at the second opening; the first locking feature of the base is a plurality of protrusions protruding laterally inward into the central cavity, the plurality of protrusions spaced axially apart from the second opening to extend over and interfere with an end of the fastener carrier opposing the insertion end when the fastener carrier is inserted into the central cavity; and the second locking feature of the fastener carrier is the end of the fastener.

Clause 6. The fastener insert of clause 1, wherein the base includes arms extending lengthwise at the outer perimeter of the body, each of the arms having a free end disposed proximate to the flange and configured to flex laterally outward under interference with the fastener carrier inserted in the central cavity.

Clause 7. The fastener insert of clause 6, wherein the fastener carrier has a ramped surface that interferes with the free end of each of the arms to flex the arms laterally outward.

Clause 8. The fastener insert of clause 6, wherein each of the arms has a ramped interior surface that projects inward toward a longitudinal axis of the central cavity so that the fastener carrier interferes with the ramped interior surface to flex the arms laterally outward.

Clause 9. The fastener insert of clause 1, wherein: the base includes arms extending lengthwise at the outer perimeter of the body, each of the arms having a free end disposed at an end of the body opposite from the flange; and each of the arms has a laterally-outward extending lip at the free end.

Clause 10. The fastener insert of clause 1, wherein the outer perimeter of the body of the base is non-circular.

Clause 11. The fastener insert of clause 1, wherein: the outer perimeter of the body of the base is circular; and the base includes a projection extending from the flange and spaced laterally apart from and parallel with a longitudinal axis of the central cavity.

Clause 12. The fastener insert of clause 1, wherein: the central cavity has an insertion end at the flange and an opposite exit end; the fastener carrier has a leading end configured for insertion at the insertion end of the central cavity; and the central cavity has a narrowed portion between the insertion end and the exit end, the leading end of the fastener carrier being wider than the narrowed portion of the central cavity so that the leading end of the fastener carrier is supported by the body at the narrowed portion.

Clause 13. The fastener insert of clause 1, wherein the fastener carrier has an end wall opposite an entrance of the fastener opening; the fastener opening is wider at the end wall than at the entrance; and the fastener insert further comprising: a threaded nut disposed in the fastener opening between the entrance and the end wall, the threaded nut having a laterally extending flange wider than the entrance so that the threaded nut is retained in the fastener opening without being coupled to the fastener carrier.

Clause 14. The fastener insert of clause 1, wherein the fastener opening is a blind hole.

Clause 15. The fastener insert of clause 1, wherein the fastener opening is a through hole.

Clause 16. The fastener insert of clause 1, wherein an entrance end of the fastener opening is countersunk into the fastener carrier.

Clause 17. A panel assembly comprising: a composite sandwich panel including: a core; a first skin covering a first side of the core; and a second skin covering an opposing second side of the core, the composite sandwich panel defining an opening extending through the core, the first skin, and the second skin, the opening having a perimeter; and a fastener insert configured to mechanically secure to the composite sandwich panel at the opening, the fastener insert including: a base having a body extending into the opening in the composite sandwich panel, an outer perimeter of the body matching a perimeter of the opening in the composite sandwich panel, the base having a flange integral with the body and extending laterally outward of the opening in the composite sandwich panel exterior to the first skin, the base defining a central cavity extending entirely through the body and the flange, and the base including a first locking feature disposed at the central cavity; and a fastener carrier configured to insert into the central cavity of the base, the fastener carrier defining a fastener opening, the fastener carrier having a second locking feature configured for mechanical engagement with the first locking feature of the base to retain the fastener carrier in the base.

Clause 18. The panel assembly of clause 17, wherein: the first locking feature of the base is a notch in an inner surface of the body at the central cavity; the second locking feature of the fastener carrier is a protrusion projecting outward at an outer surface of the fastener carrier; and the protrusion extends into the notch.

Clause 19. The panel assembly of clause 17, wherein: the first locking feature of the base is a protrusion protruding from an inner surface of the body into the central cavity; the second locking feature of the fastener carrier is a channel facing laterally outward at an outer surface of the fastener carrier; and the protrusion extends into the channel.

Clause 20. The panel assembly of clause 19, wherein the fastener carrier defines a longitudinal slot extending lengthwise partway through the fastener carrier from an insertion end of the fastener carrier, the longitudinal slot bifurcating the insertion end of the fastener carrier, enabling laterally inward deflection of the insertion end when the insertion end encounters the protrusion.

Clause 21. The panel assembly of clause 17, wherein: the central cavity has a first opening at the flange and an opposite second opening; an insertion end of the fastener carrier is wider than the second opening so that the fastener carrier is supported by the body at the second opening; the first locking feature of the base is a plurality of protrusions protruding laterally inward into the central cavity, the plurality of protrusions spaced axially apart from the second opening to extend over and interfere with an end of the fastener carrier opposing the insertion end; and the second locking feature of the fastener carrier is the end of the fastener.

Clause 22. The panel assembly of clause 17, wherein the base has an interference feature configured to engage the composite sandwich panel when the fastener carrier is mechanically engaged with the base to resist withdrawal of the body from the opening in the composite sandwich panel in a direction opposite from a direction of insertion.

Clause 23. The panel assembly of clause 22, wherein the interference feature is arms of the base, the arms extending lengthwise at the perimeter of the body, each of the arms flexing laterally outward upon interference with the fastener carrier inserted in the central cavity and having a free end disposed proximate to the flange, the free end interfering with the core with the first skin disposed between the free end and the flange.

Clause 24. The panel assembly of clause 23, wherein the fastener carrier has a ramped surface that interferes with the free end of each of the arms to flex the arms laterally outward when the fastener carrier is inserted into the central cavity.

Clause 25. The panel assembly of clause 23, wherein each of the arms has a ramped interior surface that projects inward toward a longitudinal axis of the central cavity so that the fastener carrier interferes with the ramped interior surface to flex the arms laterally outward when the fastener carrier is inserted into the central cavity.

Clause 26. The panel assembly of clause 23, wherein the interference feature is arms of the base, the arms extending lengthwise at the perimeter of the body, each of the arms having a free end disposed at an end of the body opposite from the flange, the free end having a lip that extends laterally-outward of the opening in the composite sandwich panel and interfaces with an exterior of the second skin.

Clause 27. The panel assembly of clause 17, wherein the fastener insert is flush with the second skin.

Clause 28. The panel assembly of clause 17, wherein: the opening in the composite sandwich panel is a non-circular shape; and the outer perimeter of the body of the base has the non-circular shape.

Clause 29. The panel assembly of clause 17, wherein: the opening in the composite sandwich panel is a first circular opening and the panel includes a second opening spaced apart from the first circular opening; and the base includes a projection spaced laterally apart from and extending from the flange, the projection configured to extend into the second opening when the body is inserted into the first circular opening to resist rotation of the base under torque acting on the body.

Clause 30. A method of fastening a component to a composite sandwich panel, the composite sandwich panel including a core, a first skin covering one side of the core at a first side of the composite sandwich panel, and a second skin covering an opposing side of the core at a second side of the composite sandwich panel, the method comprising: inserting a fastener insert into an opening in the composite sandwich panel in a direction from the first side to the second side, the fastener insert including a base having a body and a flange integral with and extending laterally outward from the body, an outer perimeter of the body having a shape corresponding with the opening in the composite sandwich panel, and the body having a central cavity extending through the base, wherein the fastener insert is inserted such that that the flange is disposed at the first skin of the composite sandwich panel; and forcing a fastener carrier of the fastener insert into the central cavity of the base from the first side of the composite sandwich panel to mechanically engage the fastener carrier with the base, the fastener carrier having a fastener opening extending in the fastener carrier.

Clause 31. The method of clause 30, wherein either inserting the fastener insert into the opening in the composite sandwich panel or forcing the fastener carrier to mechanically engage the fastener carrier with the base engages an interference feature of the base with the composite sandwich panel to resist withdrawal of the body from the opening in the composite sandwich panel in a direction opposite from the direction of insertion.

Clause 32. The method of clause 30, further comprising: aligning an opening in the component with the fastener opening; and inserting a fastener through the opening in the component and into the fastener opening to secure the component to the composite sandwich panel.

Clause 33. The method of clause 32, further comprising: mounting a washer at the opening in the composite sandwich panel prior to inserting the fastener through the opening in the composite sandwich panel.

Clause 34. The method of clause 32, wherein the fastener carrier is threaded, and the method further comprising: threading the fastener to the fastener carrier.

Clause 35. The method of clause 32, wherein inserting the fastener is from the second side of the composite sandwich panel.

Clause 36. The method of clause 30, wherein the fastener carrier houses a threaded nut in the fastener opening, and the method further comprising: aligning an opening in a component with the fastener opening; inserting a fastener through the opening in the component and into the threaded nut; and threading the fastener to the threaded nut to secure the component to the composite sandwich panel.

Clause 37. The method of clause 30, wherein: the opening in the composite sandwich panel is a non-circular shape; and the outer perimeter of the body of the base is the non-circular shape.

Clause 38. The method of clause 30, wherein the opening in the composite sandwich panel is circular, the composite sandwich panel includes a second opening spaced apart from the opening, the outer perimeter of the body of the base is circular, and the base includes a projection spaced laterally apart from and extending from the flange; and the method further comprising inserting the projection into the second opening in the panel.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A fastener insert for securement to a composite sandwich panel at an opening in the composite sandwich panel, the fastener insert comprising:
a base having a body and a flange integral with the body, the flange extending laterally outward of an outer perimeter of the body, the base defining a central cavity extending entirely through both the body and the flange, and the base including a first locking feature disposed at the central cavity; and
a fastener carrier configured to insert into the central cavity of the base, the fastener carrier defining a fastener opening and having a second locking feature configured for mechanical engagement with the first locking feature of the base to retain the fastener carrier to the base;
wherein the base includes arms extending lengthwise at the outer perimeter of the body, each of the arms having a free end disposed proximate to the flange at the outer perimeter and configured to flex laterally outward under interference with the fastener carrier inserted in the central cavity such that a laterally-outermost portion of the free end is laterally outward of the fastener carrier and is laterally outward of the central cavity;
wherein the outer perimeter of the body of the base is circular; and
wherein the base includes a projection extending from the flange and spaced laterally apart from and parallel with a longitudinal axis of the central cavity.

2. The fastener insert of claim 1, wherein:
the first locking feature of the base is a notch in an inner surface of the body at the central cavity;
the second locking feature of the fastener carrier is a protrusion projecting outward at an outer surface of the fastener carrier; and
the protrusion extends into the notch.

3. The fastener insert of claim 1, wherein:
the first locking feature of the base is a protrusion protruding from an inner surface of the body into the central cavity;
the second locking feature of the fastener carrier is a channel facing laterally outward at an outer surface of the fastener carrier; and
the protrusion extends into the channel.

4. The fastener insert of claim 3, wherein the fastener carrier defines a longitudinal slot extending lengthwise partway through the fastener carrier from an insertion end of the fastener carrier, the longitudinal slot bifurcating the insertion end of the fastener carrier, enabling laterally inward deflection of the insertion end when the insertion end encounters the protrusion during insertion of the fastener carrier into the base.

5. The fastener insert of claim 1, wherein:
the central cavity has a first opening at the flange and an opposite second opening;
an insertion end of the fastener carrier is wider than the second opening so that the fastener carrier is supported by the body at the second opening;

the first locking feature of the base is a plurality of protrusions protruding laterally inward into the central cavity, the plurality of protrusions spaced axially apart from the second opening to extend over and interfere with an end of the fastener carrier opposing the insertion end when the fastener carrier is inserted into the central cavity; and the second locking feature of the fastener carrier is the end of the fastener carrier.

6. The fastener insert of claim 1, wherein the fastener carrier has a ramped surface that interferes with the free end of each of the arms to flex the arms laterally outward.

7. The fastener insert of claim 1, wherein each of the arms has a ramped interior surface that projects inward toward a longitudinal axis of the central cavity so that the fastener carrier interferes with the ramped interior surface to flex the arms laterally outward.

8. The fastener insert of claim 1, wherein:
the central cavity has an insertion end at the flange and an opposite exit end;
the fastener carrier has a leading end configured for insertion at the insertion end of the central cavity; and
the central cavity has a narrowed portion between the insertion end and the exit end, the leading end of the fastener carrier being wider than the narrowed portion of the central cavity so that the leading end of the fastener carrier is supported by the body at the narrowed portion.

9. The fastener insert of claim 1, wherein the fastener carrier has an end wall opposite an entrance of the fastener opening; the fastener opening is wider at the end wall than at the entrance; and the fastener insert further comprising:
a threaded nut disposed in the fastener opening between the entrance and the end wall, the threaded nut having a laterally extending flange wider than the entrance so that the threaded nut is retained in the fastener opening without being coupled to the fastener carrier.

10. The fastener insert of claim 1, wherein the arms are biased to extend straight prior to flexing laterally outward upon interference with the fastener carrier.

11. The fastener insert of claim 1, wherein the laterally-outermost portion of the free end is laterally outward of the entire fastener carrier at a cross-section of the fastener insert taken along a longitudinal axis of the central cavity and through the free end.

12. A panel assembly comprising:
a composite sandwich panel including:
a core;
a first skin covering a first side of the core; and
a second skin covering an opposing second side of the core, the composite sandwich panel defining an opening extending through the core, the first skin, and the second skin, the opening having a perimeter; and
a fastener insert configured to mechanically secure to the composite sandwich panel at the opening, the fastener insert including:
a base having a body extending into the opening in the composite sandwich panel, an outer perimeter of the body matching a perimeter of the opening in the composite sandwich panel, the base having a flange integral with the body and extending laterally outward of the opening in the composite sandwich panel exterior to the first skin, the base defining a central cavity extending entirely through the body and the flange, and the base including a first locking feature disposed at the central cavity; and a fastener carrier configured to insert into the central cavity of the base, the fastener carrier defining a fastener opening, the fastener carrier having a second locking feature configured for mechanical engagement with the first locking feature of the base to retain the fastener carrier in the base;

wherein the base has an interference feature configured to engage the composite sandwich panel by flexing laterally outward of the central cavity and extending into the core, trapping the first skin between the interference feature and the flange when the fastener carrier is mechanically engaged with the base to resist withdrawal of the body from the opening in the composite sandwich panel in a direction opposite from a direction of insertion;

wherein the opening in the composite sandwich panel is a first circular opening and the composite sandwich panel includes a second opening spaced apart from the first circular opening; and wherein the base includes a projection spaced laterally apart from and extending from the flange, the projection configured to extend into the second opening when the body is inserted into the first circular opening to resist rotation of the base under torque acting on the body.

13. The panel assembly of claim 12, wherein:
the first locking feature of the base is a notch in an inner surface of the body at the central cavity;
the second locking feature of the fastener carrier is a protrusion projecting outward at an outer surface of the fastener carrier; and
the protrusion extends into the notch.

14. The panel assembly of claim 12, wherein the interference feature of the base is arms extending lengthwise at the outer perimeter of the body, each of the arms having a free end disposed proximate to the flange at the outer perimeter and configured to flex laterally outward under interference with the fastener carrier inserted in the central cavity such that a laterally-outermost portion of the free end is laterally outward of the fastener carrier and is laterally outward of the central cavity.

15. A method of fastening a component to a composite sandwich panel, the composite sandwich panel including a core, a first skin covering one side of the core at a first side of the composite sandwich panel, and a second skin covering an opposing side of the core at a second side of the composite sandwich panel, the method comprising:
inserting a fastener insert into an opening in the composite sandwich panel in a direction from the first side to the second side, the fastener insert including a base having a body and a flange integral with and extending laterally outward from the body, an outer perimeter of the body having a shape corresponding with the opening in the composite sandwich panel, the body having a central cavity extending entirely through the body and the flange and the base having a first locking feature disposed at the central cavity, wherein the fastener insert is inserted such that that the flange is disposed at the first skin of the composite sandwich panel; and
forcing a fastener carrier of the fastener insert into the central cavity of the base from the first side of the composite sandwich panel to mechanically engage a second locking feature of the fastener carrier with the first locking feature of the base, the fastener carrier having a fastener opening extending in the fastener carrier;

wherein forcing the fastener carrier to mechanically engage the fastener carrier with the base engages an interference feature of the base with the composite sandwich panel to resist withdrawal of the body from the opening in the composite sandwich panel in a direction opposite from the direction of insertion;

wherein the base includes arms extending lengthwise at the outer perimeter of the body, each of the arms having a free end disposed proximate to the flange at the outer perimeter and configured to flex laterally outward under interference with the fastener carrier inserted in the central cavity such that a laterally-outermost portion of the free end is laterally outward of the fastener carrier and is laterally outward of the central cavity;

wherein the outer perimeter of the body of the base is circular; and wherein the base includes a projection extending from the flange and spaced laterally apart from and parallel with a longitudinal axis of the central cavity.

16. The method of claim 15, further comprising:

aligning an opening in the component with the fastener opening; and inserting a fastener through the opening in the component and into the fastener opening to secure the component to the composite sandwich panel.

* * * * *